US011360764B2

(12) United States Patent
Murray

(10) Patent No.: US 11,360,764 B2
(45) Date of Patent: Jun. 14, 2022

(54) ADVERSARIAL LANGUAGE ANALYSIS FOR CODE SCANNING

(71) Applicant: Oracle International Corporation, Redwood Shores, CA (US)

(72) Inventor: Ryan Murray, Seattle, WA (US)

(73) Assignee: Oracle International Corporation, Redwood Shores, CA (US)

(*) Notice: Subject to any disclaimer, the term of this patent is extended or adjusted under 35 U.S.C. 154(b) by 113 days.

(21) Appl. No.: 16/939,534

(22) Filed: Jul. 27, 2020

(65) Prior Publication Data

US 2022/0027149 A1 Jan. 27, 2022

(51) Int. Cl.
*G06F 8/75* (2018.01)
*G06F 8/77* (2018.01)

(52) U.S. Cl.
CPC . *G06F 8/75* (2013.01); *G06F 8/77* (2013.01)

(58) Field of Classification Search
CPC ..................................... G06F 8/77; G06F 8/75
See application file for complete search history.

(56) References Cited

U.S. PATENT DOCUMENTS

| | | | |
|---|---|---|---|
| 6,873,935 B2 | 3/2005 | Spinrad et al. | |
| 6,880,149 B2 | 4/2005 | Cronce | |
| 8,826,222 B2 | 9/2014 | Bak et al. | |
| 8,838,559 B1* | 9/2014 | O'Riordan | G06F 8/38 |
| | | | 707/702 |
| 8,938,670 B2* | 1/2015 | Kolo | G06F 40/263 |
| | | | 715/264 |
| 9,898,460 B2* | 2/2018 | Akbik | G06F 40/58 |
| 11,030,187 B1 | 6/2021 | Boodman et al. | |
| 2017/0147621 A1 | 5/2017 | De Smet et al. | |
| 2019/0306237 A1 | 10/2019 | Srinivasan et al. | |
| 2020/0117731 A1 | 4/2020 | Deb et al. | |
| 2020/0394555 A1* | 12/2020 | Chauhan | G06F 16/13 |
| 2021/0303534 A1 | 9/2021 | Solan et al. | |

OTHER PUBLICATIONS

U.S. Appl. No. 17/028,670, First Action Interview Pilot Program Pre-Interview Communication dated Dec. 7, 2021, 5 pages.

(Continued)

*Primary Examiner* — Wei Y Zhen
*Assistant Examiner* — Amir Soltanzadeh
(74) *Attorney, Agent, or Firm* — Kilpatrick Townsend & Stockton LLP

(57) ABSTRACT

Techniques to determine a programming language of a set of code based on learned programming language patterns. One technique includes receiving a set of code, generating a pattern map of discovered string patterns from the set of code, comparing the string patterns included within the pattern map against learned programming language patterns included with a master voting map to identify one or more profiled programming languages that utilize the learned programming, language patterns that match the string patterns, generating a score card for the set of code by tallying scores for the one or more profiled programming languages based on the comparing, and determining one or more programming languages used to write the set of code based on the score card.

17 Claims, 10 Drawing Sheets

(56) References Cited

OTHER PUBLICATIONS

Code Compare, Available Online at: https://www.devart.com/codecompare/text-compare-tool-structure-comparison.html, retrieved May 5, 2020, 1 page.

Code Compare is a Powerful Tool for File and Folder Comparison and Merging, Available Online at: https://marketplace.visualstudio.com/items?itemName=DevartSoftware.CodeCompare, retrieved May 5, 2020, 6 pages.

Code Reference Information, Available Online at: https://www.jetbrains.com/help/idea/viewing-reference-information.html, retrieved May 5, 2020,, 1 page.

Compare Files, Folders and Text Sources, Available Online at: https://www.jetbrains.com/help/idea/comparing-files-and-folders.html, retrieved May 5, 2020, 2 pages.

Compare Local Changes with the Repository Version, Available Online at https://www.jetbrains.com/help/idea/viewing-changes-information.html, retrieved May 5, 2020, 5 pages.

IntelliJ IDEA, Available Online at: from, 2020, retrieved May 5, 2020, 1 page.

Source File Structure, Available Online at: https://www.jetbrains.com/help/idea/viewing-structure-of-a-source-file.html, retrieved May 5, 2020, 1 page.

Estes, An Introduction to Diffs and Patches, Available Online at: https://opensource.com/article/18/8/diffs-patches, Aug. 27, 2018, 7 pages.

Phoujdar, Verify the Integrity of Directory Trees Using Checksum Verifier, Available Online at: https://www.codeproject.com/Articles/26110/Verify-the-integrity-of-directory-trees-using-Chec, May 15, 2008, 4 pages.

Wang et al., Checksum-Aware Fuzzing Combined with Dynamic Taint Analysis and Symbolic Execution, ACM Transactions on Information and System Security, vol. 14, No. 2, Article 15, Available Online at: https://dl.acm.org/doi/pdf/10.1145/2019599.2019600, Sep. 2011, pp. 15:1-15:28.

U.S. Appl. No. 17/028,670, Notice of Allowance dated Feb. 22, 2022, 23 pages.

* cited by examiner

ADVERSARIAL LANGUAGE ANALYSIS FOR CODE SCANNING

FIELD

The present disclosure relates generally to code scanning, and more particularly, to techniques to determine a programming language of a set of code based on learned programming language patterns.

BACKGROUND

Software Development Life Cycle (SDLC) is a process used by the software industry to design, develop and test high quality software. One of the primary tasks in SDLC is code review. Code review is a process that identifies bugs and vulnerabilities in code which may cause a problem in a later stage of the software development process and/or ultimately lead to defective or insecure software. In the SDLC, the code review process typically comes under the development phase, which means that when the software is being coded by the developers, they can perform self-code review, peer code review, specialist code review (e.g., a security analyst), or a combination thereof. The developers may use automated code review tools, which can be combined with their integrated development environment (IDE), for code review assistance, and in some instances allow for developers to perform coding and code review simultaneously. There are many different automated code review tools, also known as code scanners, available that can rapidly look at code to identify vulnerabilities, identify bugs, validate code against industry best practices, validate code against company-specific project specifications, or the like.

Generally automated code review tools can be classified into one of two groups based on the type of analysis being performed: dynamic analysis or static analysis. Dynamic analysis is performed on executable code of a compiled program and checks only user-specific behavior. That is, only the code (e.g., object code), executed during a test is checked. A dynamic analyzer can provide the developer with information on memory leaks, program's performance, call stack, etc. Static analysis allows checking program code (e.g., source code) before the tested program is executed. A compiler typically performs static an during the compilation process. However, in large real-life projects it is often necessary to perform static analysis through-out development to ensure the source code fulfills additional requirements including reliability, maintainability, readability, testability, portability, and vulnerability. There are many different analysis techniques implemented by dynamic and static analyzers, such as abstract syntax tree (AST) walker analysis, dataflow analysis, path-sensitive data flow analysis, etc. Concrete implementations of these techniques vary from analyzer to analyzer. Dynamic and static analyzers for different programming languages can be based on various analysis frameworks. These frameworks contain core sets of common techniques, which can be used in dynamic and static analyzers so that these analyzers reuse the same infrastructure. However, the supported analysis techniques and the way these techniques are implemented varies from framework to framework dependent on the programming language of the code to be analyzed. Accordingly, consistent and efficient techniques for determining the programming language of the code is desired.

BRIEF SUMMARY

Techniques are provided (e.g., a method, a system, non-transitory computer-readable medium storing code or instructions executable by one or more processors) for determining a programming language of a set of code based on learned programming language patterns.

In various embodiments, a method is provided that comprises: receiving, by a data processing system, a set of code; generating, by the data processing system, a pattern map of discovered string patterns from the set of code, where the string patterns comprise words and linear combinations thereof in the set of code; comparing, by the data processing system, the string patterns included within the pattern map against learned programming language patterns included within a master voting map to identify one or more profiled programming languages that utilize the learned programming language patterns that match the string patterns, where the master voting map comprises for each learned programming language pattern, a first weight or a second weight associated with the one or more profiled programming languages that utilize the learned programming language pattern; generating, by the data processing system, a score card for the set of code, where the generating comprises tallying scores for the one or more profiled programming languages based on the comparing and the first weight or the second weight associated with the one or more profiled programming languages that utilize the learned programming language patterns that match the string patterns, and recording the scores with the one or more profiled programming languages in the score card; and determining, by the data processing system, one or more programming languages used to write the set of code based on the score card.

In some embodiments, the generating the pattern map comprises: parsing and splitting the set of code by lines and by words; identifying the words and linear combinations thereof in each line; counting a number of times each word and each linear combination thereof is identified within the set of code to obtain count values of each word and each linear combination thereof; flattening the pattern map by merging multiple instances of each word and each linear combination thereof into single instances based on the counting and associating the count values of each word and each linear combination thereof to the single instances of each word and each linear combination thereof; and sorting the single instances of each word and each linear combination thereof based on the count values.

In some embodiments, the pattern map comprises: (i) the string patterns for each word and each linear combination thereof identified throughout the set of code; and (ii) the count value for each word and each linear combination thereof indicative of a number of occurrences for each word and each linear combination thereof throughout the set of code.

In some embodiments, the learned programming language patterns comprise words and linear combinations thereof in the one or more profiled programming languages; the comparing the string patterns included within the pattern map against the learned programming language patterns included within the master voting map, comprises: comparing (i) each word and each linear combination thereof of the string patterns that has a count value equal to or greater than a predetermined threshold, against (ii) each word and each linear combination thereof of the learned programming language patterns, to identify the one or more profiled programming languages that utilize the learned programming language patterns that match the string patterns; and the tallying the scores for the one or more profiled programming languages comprises summing the first weight or the second weight associated with the one or more profiled programming languages that utilize the learned programming language patterns that match the string patterns.

In some embodiments, the method further comprises: determining one or more programming languages to be profiled; for each programming language to be profiled, selecting sets of code written in the programming language to be profiled from one or more known sources or repositories of code; for each programming language to be profiled, generating, by the data processing system, a pattern map of the learned programming language patterns from the sets of code written in the programming language to be profiled, wherein the learned programming language patterns comprise words and linear combinations thereof in the sets of code; and for each programming language to be profiled, comparing, by the data processing system, the pattern map generated for the programming language to be profiled against the pattern maps generated for the other profiled programming languages to be profiled, and generating, by the data processing system, the master voting map based on the comparisons between the programming languages to be profiled.

In some embodiments, the generating the master voting map comprises: removing, based on the comparing, each word and each linear combination of words that are found across all programming language to be profiled; applying, based on the comparison, the first weight to each word and each linear combination of words that are found in only a single programming language to be profiled; and applying, based on the comparison, the second weight to each word and each linear combination of words that are found in multiple programming languages to be profiled; and populating the master voting map with each word and each linear combination of words that have the first weight or the second weight applied.

In some embodiments, the second weight is only applied to each word and each linear combination of words that are found in two or three programming languages to be profiled.

In some embodiments, a system is provided that includes one or more data processors and a non-transitory computer readable storage medium containing instructions which, when executed on the one or more data processors, cause the one or more data processors to perform part or all of one or more methods disclosed herein.

In some embodiments, a computer-program product is provided that is tangibly embodied in a non-transitory machine-readable storage medium and that includes instructions configured to cause one or more data processors to perform part or all of one or more methods disclosed herein.

DETAILED DESCRIPTION

Figure 1:
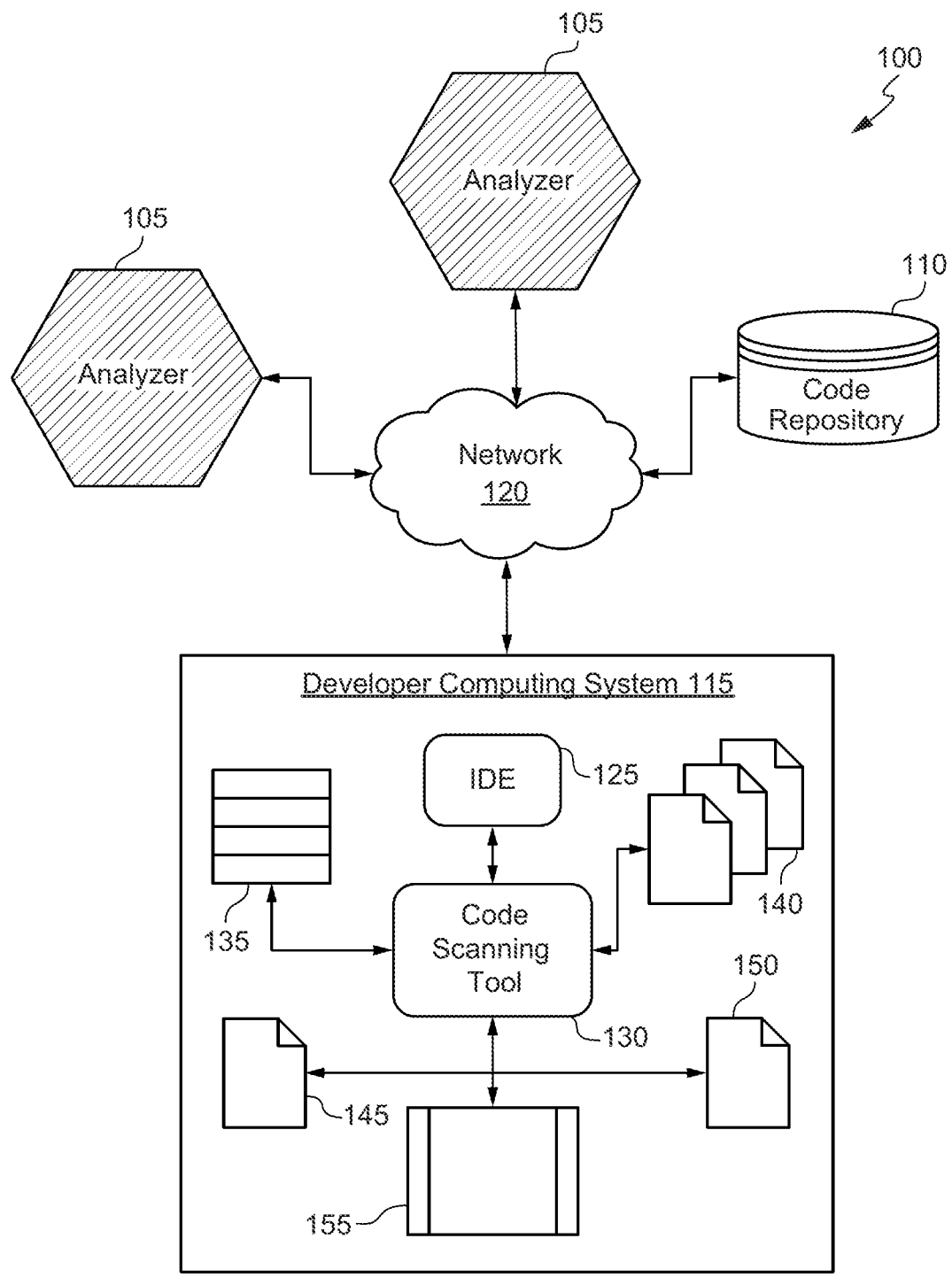
FIG. 1 is a block diagram illustrating a computing system for scanning and analyzing code in accordance with various embodiments.

In the following description, various embodiments will be described. For purposes, of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Introduction

In various embodiments, a code scanning tool is provided that can be used to determine a programming language of a set of code based on learned programming language patterns. The code scanning tool may be implemented as a standalone piece of software, hardware, or combination thereof, or implemented in a variety of applications including code editors, web browsers, software design tools, code analyzers, etc. In some embodiments, the code scanning tool is implemented as part of a toolbar or menu, and when invoked by a user, helps the user determine a programming language of a set of code based on learned programming language patterns. As used herein, a "programming language" refers to a formal language comprising a set of instructions that instruct a computing, device on one or more tasks to be performed to generate various kinds of output. Examples of programming language include Java, Java Script, C+, C++, C#, Python, Go, Rust, Elm, Ruby, Datalog, Prolog, and the like. As used herein, "code" is a term used for both the programming statements written in a particular programming language, i.e., the source code, and a term for the source code after it has been processed by a compiler and made ready to run in the computer, i.e., the object code. To code is to write the programming statements—that is, to write the source code for a program in a programming language.

Many processes and applications used in SDLC require the input set of code to be, of a known programming language (e.g., Java). For example, scanning source code using an automated code review tool such as a static analyzer requires knowing the programming language used to write the code. Two conventional methods for determining the programming language used to write the code are: (1) receiving identity of the programming language from the developer or creator of the code, or (2) assuming identity of the programming language from the file extensions, e.g., file1.java~=file2.txt~=text. However, both of these conventional methods are susceptible to deception by adversaries providing incorrect data. For example, the developer or creator may make a false statement concerning the identity of the programming language to directly obscure the true identity of the programming language and avoid proper code scanning, or the developer or creator may change the file extension to indirectly obscure the true identity of the programming language and avoid proper code scanning.

To overcome the challenges of determining the programming language used to write the code, various embodiments are directed to a code scanning tool that can be used to automatically determine a programming language of a set of code based on learned programming language patterns. In various embodiments, a technique implemented by the code scanning tool includes: receiving, by a data processing system, a set of code; generating, by the data processing system, a pattern map of discovered string patterns from the set of code, where the string patterns comprise words and linear combinations thereof in the set of code; comparing, by the data processing system, the string patterns included within the pattern map against learned programming language patterns included within a master voting map to identify one or more profiled programming languages that utilize the learned programming language patterns that match the string patterns, where the master voting map comprises for each learned programming language pattern, a first weight or a second weight associated with the one or more profiled programming languages that utilize the learned programming language pattern; generating, by the data processing system, a score card for the set of code, where the generating comprises tallying scores for the one or more profiled programming languages based on the comparing and the first weight or the, second weight associated with the one or more profiled programming languages that utilize the learned programming language patterns that match the string patterns, and recording the scores with the one or more profiled programming languages in the score card; and determining, by the data processing system, one or more programming languages used to write the set of code based on the score card.

Code Scanning Environment

FIG. 1 is a block diagram illustrating a computing system 100 for scanning and analyzing code in accordance with various embodiments. As shown in FIG. 1, one or more analyzers 105 (e.g., code scanners), code repository 110, and developer computing system 115 communicate with each other across network 120. Computing system 100 may be computerized such that each of the illustrated components comprises a computing device that is configured to communicate with other computing devices via network 120. For example, developer computing system 115 may include one or more computing devices, such as a desktop, notebook, or handheld computing device that is configured to transmit and receive data to/from other computing devices via network 120. Similarly, the analyzers 105 and code repository 110 may include one or more computing devices that are configured to communicate data via the network 120. In some embodiments, these computing systems may be implemented using one or more computing devices dedicated to performing the respective operations of the systems as described herein.

The analyzers 105 can be a computing system that analyzes code (e.g., source code) to identify vulnerabilities, identify bugs, validate code against industry best practices, validate code against company-specific project specifications, or the like (e.g., for detecting defects in a software project's source code). Each of the analyzers 105 can contain multiple modules and/or components for performing its operations. In some embodiments, each analyzer 105 includes a data collector and an analysis engine. The data collector is configured to, obtain or receive code for analysis. In some instances, the data collector is configured to obtain or receive code from the code repository 110. The analysis engine is configured to analyze the obtained or received code using one or more analysis techniques and output metrics consistent with the one or more analysis techniques. The modules and/or components process the code using syntax and context of the programming language used to write the code, and thus each analyzer 105 is specifically configured for processing the code based on the programming language used to write the code (e.g., a first analyzer may be configured to analyze java type code and a second analyzer may be configured to analyze text type code).

In some instances, the analysis engine is configured to split the code into tokens, i.e., constants, identifiers, reserved symbols, etc. This operation may be performed by a lexer component of the analysis engine responsible for dividing the input code into individual tokens, identifying the type of the tokens, and passing tokens one at a time to the next stage of the analysis. Thereafter, the tokens are passed to a parser component of the analysis engine, which builds an AST based on the tokens. The lexer may process the code using syntax of the programming language used to write the code and the parser has an understanding of the programming language's grammar to recognize context of the code. Once the code is processed, the analysis engine is configured to analyze the code over the AST using one or more different analysis techniques, such as pattern matching, AST walker analysis, dataflow analysis, path-sensitive data flow analysis, or the like. The modules and/or components of the analyzer 105 may communicate data between each other according to known data communication techniques and, in some embodiments, can communicate with external computing systems such as code repository 110 and developer computing system 115.

The code repository 110 may be one or more computing systems that store, maintain, and track modifications to one or more code bases (e.g., sets of code). Generally, code repository 110 may be one or more data storage devices such as a server computing system configured to accept requests for versions of a code project and accept changes as provided by external computing systems, such as developer computer system 115. For example, code repository 110 may include a web server and code repository 110 can provide one or more web interfaces allowing external computing systems, such as analyzer 105 and developer computer system 115 to access and modify code stored by code repository 110. Code repository 110 can also expose art application programming interface (API) that can be used by external computing systems to access and modify the stored code. Further, while the embodiment illustrated in FIG. 1 shows code repository 130 in singular form, in some embodiments, more than one code repository having features similar to code repository 110 can be connected to network 120 and communicate with the computer systems described in FIG. 1, consistent with disclosed embodiments.

In some instances, code repository 110 performs operations for tracking programming languages identified to be used for writing the code, defects determined to be in the code, and/or any modifications made to the code (e.g., modifications to address determined defects in the code or modifications to the code in general to support new aspects of the software). In general, when a user (e.g., a security analyst or developer) identifies a programming language (could also be multiple programming languages) used to write a set of code or finds a defect (could also be multiple defects) in the code, the user can report the programming language and/or defect to the code repository 110 using, for example, an API or user interface made available to developer computer system 115. The programming language and/or defects may be included in one or more lists or databases of programming language or defects associated with the code project. When the programming language is identified and/or the defect is remedied through a code modification code repository 110 can accept the programming language and/or the code modification and store metadata related to the programming language and/or modification. The metadata can include for example, the programming, language used to write the code, the version or branch of the code containing each programming language, the nature of the defect, the location of the defect, the version or branch of the code containing the defect, the version or branch of the code containing the fix for the defect, and the identity of the developer and/or developer computer system 115 submitting the programming language and/or modification. In some embodiments, code repository 110 makes the metadata available to external computing systems for access and downstream processing.

The developer computer system 115 may be a computer system used by a user such as a software developer or security analyst for writing, reading, modifying, or otherwise accessing code (e.g., a security analyst accessing to analyze code for security vulnerabilities) stored in code repository 110. While the developer computer system 115 is typically a personal computer, such as one operating a UNIX, Windows, or Mac OS based operating system, developer computer system 115 can be any computing system configured for writing, reading, modifying, or otherwise accessing code. Generally, developer computer system 115 includes one or more developer tools and applications for software development. These tools may include, for example, an IDE 125 and a code scanning tool 130. An IDE 125 is typically a software application providing comprehensive facilities to software developers for developing software and normally comprises a source code editor, build automation tools, and a debugger. Some IDEs allow for customization by third parties, which can include add-on or plug-in tools that provide additional functionality to developers. The code scanning tool 130 is software, hardware, or a combination thereof providing capabilities to users such as software developers or security analysts for determining a programming language of a set of code based on learned programming language patterns, as described in detail herein. In some instances, IDEs 125 executing on developer computer system 115 can include plug-ins for communicating with the analyzer 110, code repository 115, and/or code scanning tool 130. Further, while the embodiment illustrated in FIG. 1 shows code scanning tool 130 as residing within the developer computer system 115, in some embodiments, the code scanning tool 130 can reside in a different computing system such as the analyzer 105 (or a computing system entirely remote from system 100) and may be connected to network 120 and communicate with the computer systems described in FIG. 1, consistent with disclosed embodiments.

In some embodiments, developer computer system 115 stores and executes instructions that perform one or more operations associated with the analyzer 110, code repository 115, and/or code scanning tool 130. In some instances, the developer computer system 115 is configured to control the analyzer 110, code repository 115, and/or code scanning tool 130 to perform one or more offline and online processes. Offline processes as used herein being processes associated with training modules of the code scanning tool 130 to profile programming languages by learning various programming language patterns and maps. Online processes being processes associated with using trained modules of the code scanning tool 130 to determine a programming language of a set of code based on the learned programming language patterns and maps. In some instances, the offline process includes a profile process comprising operations for profiling one or more new programming languages. Some of these operations may be reused in other processes, however the overall profile process its entirety is intended to be performed initially, in an off line manner, to profile one or more new programming languages. The resulting master voting map is the key deliverable of the profile process, and the voting map is used to make language determinations during the online process evaluation.

The operations of the profile process may include selecting known sources of code for each programming language 135 to be profiled. For example, Java files within code repositories may be selected to profile Java programming language. In some instances, the known sources of code for each programming language 135 to be profiled are selected from the code repository 110. The operations of the profile process may further include, for each programming language to be profiled, generating a pattern map 140 of discovered programming language patterns from a set of code within the selected source of code. The operations of the profile process may further include comparing the pattern maps 140 from each programming language 135 to be profiled against one another, and creating a master voting map 145 based on the comparison. If additional programming language profiles are desired for performing determinations after the initial profile process, the following operations of an add profile process may be performed. The resulting deliverable is an updated master voting map 145. The operations of the add profile process may include selecting a known source of code for the new programming language to be profiled; and generating a pattern map 140 as described with respect to the profile process. Thereafter, the newly generated pattern map 140 is compared against the prior generated pattern maps 140 and the master voting map 145 is updated based on the comparison.

In some instances, the online process includes a compare process comprising operations for evaluating input files (e.g., a set of code) against one or more profiled programming languages to determine a programming language of the input file based on the learned programming language patterns. The deliverable from the compare process is a score card, with points allocated for each of one or more programming languages that were profiled. The operations of the compare process, may include generating a pattern map 150 of discovered string patterns from the input files; comparing the pattern map 150 against the master voting map 145; and creating a score card 155 based on the comparison. The score card 155 comprises points allocated for each of the one or more programming languages that were profiled. The highest scored programming language may be selected as the input file's language.

Network 120 may be any type of network familiar to those skilled in the art that can support data communications using any of a variety of commercially-available protocols, including without limitation TCP/IP, SNA, IPX, AppleTalk, and the like. Merely by way of example, network 120 can be a local area network (LAN) such as an Ethernet network, a Token-Ring network and/or the like, a wide-area network (WAN), a virtual network, including without limitation a virtual private network (VPN), the Internet, an intranet, an extranet, a public switched telephone network (PSTN), an infra-red network, a wireless network (e.g., a network operating under any of the IEEE 802.1X suite of protocols, the Bluetooth protocol known in the art, and/or any other wireless protocol), and/or any combination of these and/or other networks. Any other combination of networks, including secured and unsecured network communications are contemplated for use in the systems described herein. Although exemplary computing system 100 is shown with two analyzers and one developer computing system, any number of analyzers and/or developer computing devices may be supported, in other embodiments.

Adversarial Language Analysis Techniques

Figure 2:
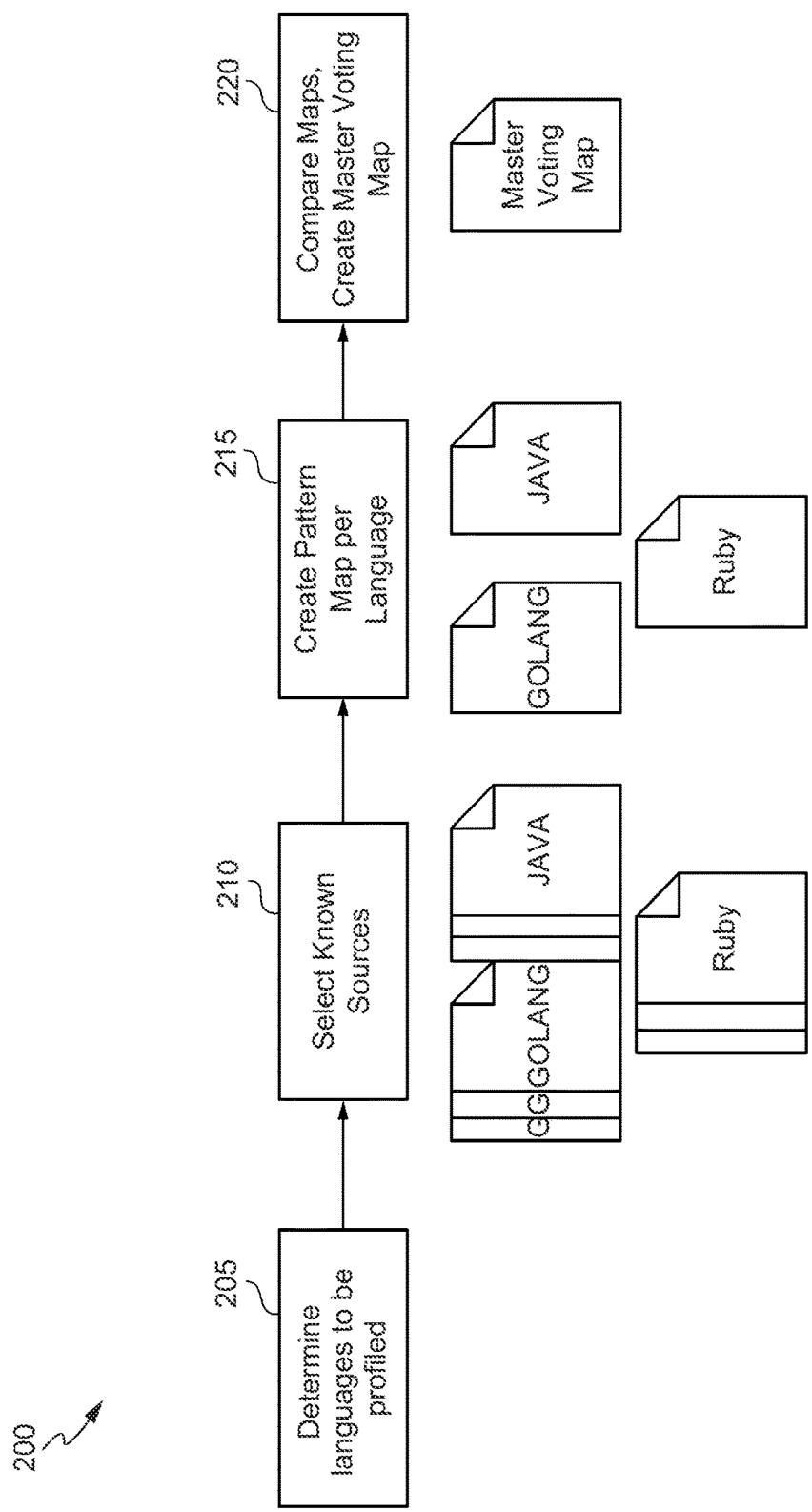
FIG. 2 depicts a flowchart illustrating a process for generating a master voting map (or updated master voting map) for profiled programming languages in accordance with various embodiments.

FIG. 2 illustrates processes and operations for generating a master voting map (or updated master voting map) for profiled programming languages. Individual embodiments may be described as a process which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

The processes and/or operations depicted in FIG. 2 may be implemented in software (e.g., code, instructions, program) executed by one or more processing units (e.g., processors cores), hardware, or combinations thereof. The software may be stored in a memory (e.g., on a memory device, on a non-transitory computer-readable storage medium). The particular series of processing steps in FIG. 2 is not intended to be limiting. Other sequences of steps may also be perforated according to alternative embodiments. For example, in alternative embodiments the steps outlined above may be performed in a different order. Moreover, the individual steps illustrated in FIG. 2 may include multiple sub-steps that may be performed in various sequences as appropriate to the individual step. Furthermore, additional steps may be added or removed depending on the particular applications. One of ordinary skill in the art would recognize many variations, modifications, and alternatives.

FIG. 2 shows a flowchart 200 that illustrates a process for generating a master voting map (or updated master voting map) for profiled programming languages. This process is primarily used for training the code scanning tool on a corpus of known programming language(s) to learn programming language patterns associated with each programming language. The learned programming language patterns are compiled into the master voting map and may be used by the trained code scanning tool in downstream processes to determine a programming language of a set of code based on the learned programming language patterns. In some embodiments, the processes depicted in flowchart 200 may be implemented by the architecture, systems, and techniques depicted in FIGS. 1, 6, 7, and 8.

At step 205, when a code scanning tool (e.g., the code scanning tool 130 described with respect to FIG. 1) is initially configured, one or more programming languages to be profiled are determined. This determination may be made based on user input or via automatic determination by the code scanning tool (e.g., selection of a default set of programming languages or selection of programming languages typically associated with a given software project/environment). In some instances, the determination is made based on the type of code expected to be used by a given client. In other instances, the determination is made based on the type of code expected to be used in a given software application. For example, if a user is assigned a task of scanning a set of code for security vulnerabilities in a Java Applet, then there should be an expectation that the set of code will at least contain some Java programming language. Consequently, Java programming language should be profiled such that the code scanning tool can detect and verify Java programming language was used to write a set of code for implementing the Java Applet.

At step 210, for each programming language to be profiled, sets of code written in the programming language to be profiled are selected from one or more known sources or repositories of code. For example, if the programming languages to be profiled include Java, Go, and Ruby, then sets of Java code are selected from known source or repositories (e.g., a Java repository) to profile Java programming language, sets of Go code are selected from known sources or repositories (e.g., a Go repository) to profile Go programming language, and sets of Ruby code are selected from known sources of repositories (e.g., a Ruby repository) to profile Ruby programming language. In some instances, the known sources or repositories of the code comprise multiple files (e.g., sets, of code) of the desired type of programming language (e.g., Java) such that the code scanning tool is trained on an adequate number and variety of code exemplary of the desired type of programming language for robust learning of programming language patterns and profiling of the programming language. The sets of code may be selected manually by a user or automatically by the code scanning tool based on the determined one or more programming languages to be profiled.

At step 215, for each programming language to be profiled, a pattern map of discovered programming language patterns is generated from the selected sets of code written in a programming language to be profiled. For example, if the programming languages to be profiled include Java, Go, and Ruby, then a Java pattern map of discovered programming language patterns is generated from the selected sets of code written in Java programming language, a Go pattern map of discovered programming language patterns is generated from the selected sets of code written in Go programming language, and a Ruby pattern map of discovered programming language patterns is generated from the selected sets of code written in Ruby programming language. The programming language patterns comprise words and linear combinations thereof in each line of the selected sets of code. A word having one or more ISO basic Latin script characters that are not separated by spaces. A line being a string of tab-delimited and contiguous words.

Figure 3:
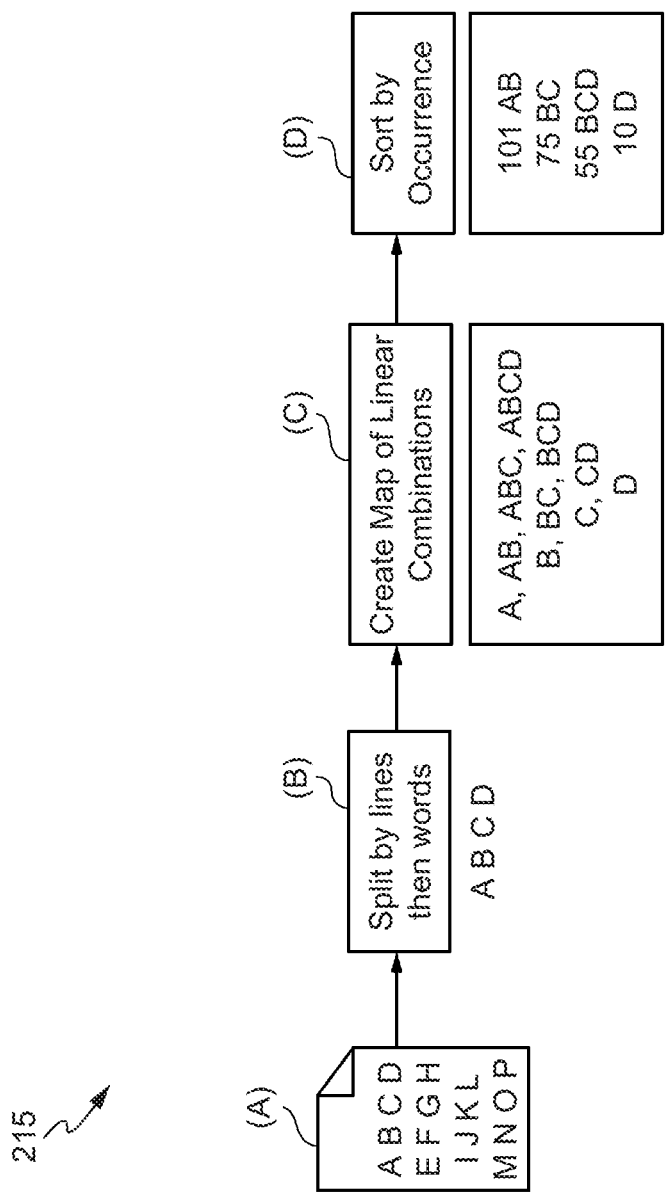
FIG. 3 depicts a flowchart illustrating a process for generating a pattern map in accordance with various embodiments.

As shown in FIG. 3, generating a pattern map in step 215 comprises: (A) inputting the selected sets of code; and (B) parsing and splitting the sets of code by lines and by words. Generating the pattern map further comprises: (C) generating a map of words and linear combinations thereof in each line (programming language patterns). For example, in an instance where a line of code has three words: "public class Main {"; the words and linear combinations thereof for the line of code sinning from left to right would be the first word="public"; a string concatenation of the first word plus the second word="public class"; a string concatenation of the first word plus the second word plus the third word="public class Main"; the second word="class"; a string concatenation of the second word plus the third word="class Main"; and the third word="Main". The linear combinations are obtained by starting with each word within a line of code and then stepping down one word at a time from each starting word and generating concatenations of each possible combination of words within the line of code. The generating the pattern map is an incremental mapping process that: (i) counts a number of times each word or linear combination of words is found within the sets of code, and (ii) flattens the map by merging multiple instances of each word or linear combination of words into single instances with the counts of instances thereof. Thus, if the sets of code comprise the linear combination "public class" 252 times, the pattern map would not include 252 separate instances of "public class" but instead would include a single instance of "public class" with a count value of 252.

The generating the pattern map further comprises: (D) sorting the words and linear combinations thereof based on the count values. The words and linear combinations can be sorted based on any criteria related to count values, e.g., sorted least count value to greatest count value or greatest count value to least count value. For example, if the first word="public" is found 413 times throughout the sets of code, the combination of the first word plus the second word="public class" is found 124 times, and the second word plus the third word="class Main" is found 205 times throughout the sets of code, then the pattern map sorted by greatest count value to, least count value would comprise: "public" (413) followed by "class Main" (205) followed by "public class" (124). The end result of step 215 is a profile exemplified by the pattern map generated for each programming language to be profiled, the pattern map comprising: (i) the learned programming language patterns for each word and linear combinations thereof identified throughout the sets of code, and (ii) a value for each word and linear combinations thereof indicative of a number of occurrences for each word and linear combinations thereof throughout the sets of code.

With respect back to FIG. 2, at step 220, for each programming language to be profiled, the pattern map generated for a programming language to be profiled is compared against pattern maps generated for the other programming languages to be profiled, and a master voting map is generated based on the comparisons between the programming languages to be profiled. The master voting map comprises: (i) a combination of learned programming language patterns found throughout the programming languages to be molded; and (ii) for each learned programming language pattern, a weight associated with the one or more programming languages to be profiled that utilize the learned programming language pattern. For example, if the programming languages to be profiled include Java, Go, and Ruby, then the pattern map generated for Java may be compared to the pattern maps generated for Go and Ruby, the pattern map generated for Ruby may be compared to the pattern maps generated for Go and Java, and the pattern map generated for Go may be compared to the pattern maps generated for Ruby and Java. A single master voting map is generated that includes words and linear combinations thereof found in the pattern maps for Java, Go, and Ruby with associated weights determined based on the comparisons between Java, Go, and Ruby.

The comparison includes, for each programming language to be profiled, comparing each word and each linear combination thereof of the learned programming language patterns associated with the programming language to be profiled against the learned programming language patterns for each word and each linear combination thereof of the learned programming language patterns associated with the other programming languages to be profiled. For example, if the learned programming language patterns of a programming language to be profiled include "public" (413); "class Main" (205); and "public class" (124), then the comparison process would compare those learned programming language patterns against the learned programming language patterns of the other programming languages to be profiled to determine whether "public"; "class Main"; and "public class" are within the learned programming language patterns of the other programming languages to be profiled. The purpose of the comparison is to identify learned programming language patterns of a programming language to be profiled that are found within the learned programming language patterns of one or more other programming languages to be profiled. In some instances, the comparison is thresholded based on count value such that only prevalent learned programming language patterns are searched for in the other programming languages to be profiled. For example, a predetermined count value threshold of 5, 10, 15, 20, etc. may be set for the comparison process such that only the learned programming language patterns with count value equal to or greater than the predetermined count value threshold are compared against the other programming languages to be profiled. This would constrain the comparison such that noise (those learned programming language patterns with a lower probability of being determinative of the programming language) are removed (e.g., a minor learned, programming language pattern such as "gladiator" (1)) and only prevalent learned programming language patterns (those learned programming language patterns with a higher probability of being determinative of the programming language) are searched for in the other programming languages to be profiled.

The generating the master voting map includes removing, based on the comparison, each word and each linear combination of words that are found across all programming languages to be profiled. This filters out those words and linear combinations of words that are not unique to any programming language, and thus not determinative of any one or more programming languages. The generating the master voting map further includes applying, based on the comparison, a first weight such as a full point (e.g., 1) to each word and each linear combination of words that are found in only a single programming language to be profiled. This applies a stronger weight to those words and linear combinations of words that are unique to a single programming language, and thus are strongly determinative of a programming language. The generating the master voting map further includes applying, based on the comparison, a second weight such as a partial point (e.g., 0.2, 0.4, 0.6, etc.) to each word and each linear combination of words that are found in multiple programming languages to be profiled. This applies a weaker weight for those words and linear combinations of words that are found in multiple programming languages, and thus may be weakly determinative of a programming language. The generating the master voting map further includes populating the master voting map with each word and each linear combination of words that have the first weight or the second weight applied.

In some instances, the second weight or partial points are scored using a threshold scheme. For example, a predetermined point threshold may be set (e.g., set at a number such as 2, 3, 4, 5, etc.) and each word and each linear combination of words that are found in a determined number of programming languages that is equal to or less than the predetermined threshold (but not one) will be scored with a partial point that is associated with the programming language having the word or linear combination of words. As should be understood, the scoring and threshold scheme for partial points may be more complex, for example, a first partial point (e.g., 0.2) could be scored for words or linear combinations of words that are found in three to four programming languages; whereas a second partial point (e.g., 0.5) could be scored for words or linear combinations of words that are found in two programming languages. It should also be understood, other thresholding schemes may be implemented within the spirit and scope of the present disclosure to provide partial points to words and linear combinations of words based on the comparisons between the programming languages.

The end result of step 220 and process 200 is a master voting map comprising: (i) a combination of learned programming language patterns (i.e., words and linear combinations of words) that are found across profiled programming languages (but not in all of the profiled programming languages), and (ii) for each learned programming language pattern, a first weight or a second weight associated with the one or more profiled programming languages that utilize the learned programming: language pattern. For example, if a linear combination "class Main" is found only in Java out of the profiled programming languages Java, Go, and Ruby, a linear combination "func main" is found in Java and Go out of the profiled programming languages Java, Go, and Ruby, a linear combination "return true if" is found in Ruby out of the profiled languages Java, Go, and Ruby, and the word "class" is found in all profiled programming languages out of the profiled languages Java, Go, and Ruby, then the master voting map would comprise: "class Main" (Score of 1 for Java); "func main" (Score of 0.2 for Java and Score of 0.2 for Go); and "return true if" (Score of 1 for Ruby). Note that the word "class" is left out of the master voting map because it is found in all profiled programming languages, and not determinative of any one or more programming languages.

Once the master voting map is obtained by process 200, if additional programming languages are desired for performing determinations, the following process steps may be performed for the additional programming languages. The resulting deliverable is an updated master voting map. The steps include, for each of the additional programming language, repeating steps 210 and 215 to identify known sources of the additional programming language and generate a pattern map for the additional programming language. The steps further include, for each of the additional programming language, repeating step 220 using the newly generated pattern map and the pattern maps generated for the other profiled programming languages (i.e., the preexisting pattern maps which may be stored or retained in a memory storage device). The result is an updated, master voting map comprising: (i) a combination of learned programming language patterns (i.e., words and linear combinations of words) that are found across profiled programming languages including the additional programming languages (but not in all of the profiled programming languages), and (ii) for each learned programming language pattern, a first weight or a second weight associated with the one or more profiled programming languages that utilize the learned programming language pattern.

Figure 4:
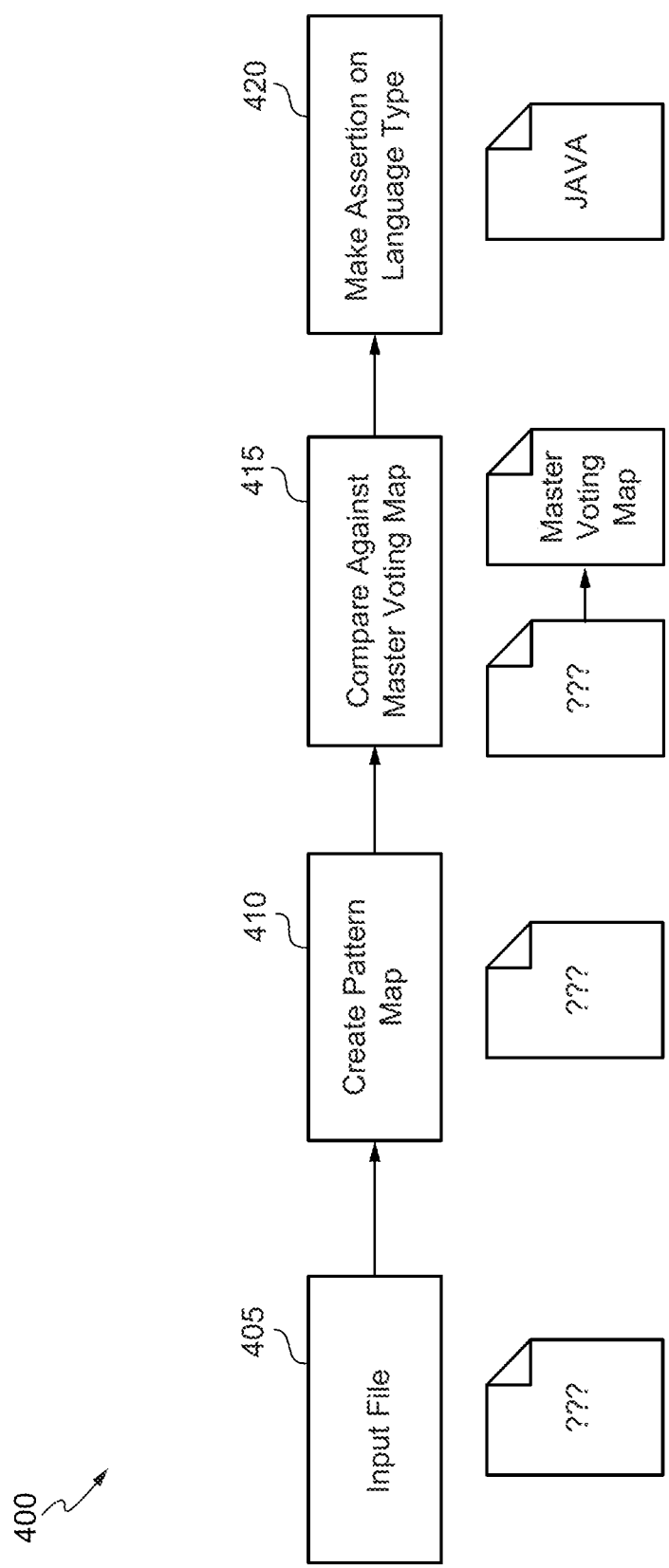
FIG. 4 depicts a flowchart illustrating a process for determining a programming language of a set of code based on learned programming language patterns in accordance with various embodiments.

FIG. 4 illustrates processes and operations for determining a programming language of a set of code based on learned programming language patterns. Individual embodiments may be described as a process which is depicted, as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

The processes and/or operations depicted in FIG. 4 may be implemented in software (e.g., code, instructions, program) executed by one or more processing units (e.g., processors cores), hardware, or combinations thereof. The software may be stored in a memory (e.g., on a memory device, on a non-transitory computer-readable storage medium). The particular series of processing steps in FIG. 4 is not intended to be limiting. Other sequences of steps may also be performed according to alternative embodiments. For example, in alternative embodiments the steps outlined above may be performed in a different order. Moreover, the individual steps illustrated in FIG. 4 may include multiple sub-steps that may be performed in various sequences as appropriate to the individual step. Furthermore, additional steps may be added or removed depending on the particular applications. One of ordinary skill in the art would recognize many variations, modifications, and alternatives.

FIG. 4 shows a flowchart 400 that illustrates a process for determining a programming language of a set of code based on learned programming language patterns. In some embodiments, the processes depicted in flowchart 400 may be implemented by the architecture, systems, and techniques depicted in FIGS. 1, 6, 7, and 8. At step 405, a set of code is input into a trained code scanning tool (e.g., the code scanning tool 130 described with respect to FIG. 1 and trained in accordance with process 200 described with respect to FIG. 2). For example, the set of code may be received or obtained as a project for a security analyst to scan and analyze the set of code for security vulnerabilities, or as a project for a developer to scan and analyze the set of code for bugs or defects. In some instances the set of code is multiple sets of code and/or the set(s) of code comprise multiple folders and files in a directory type data storage structure. In some instances, the set of code is written in a single programming language. In other instances, the set of code is written in one or more programming languages, e.g., some folders or files of code may be written in Java and some folders or files may be written in Ruby. The set of code may be written in an undetermined programming language to (e.g., someone or something has opined or stated that the code is written in one or more programming languages but the code scanning tool has not made this determination), an unknown programming language (e.g., no one or nothing has offered a statement or opinion on what programming language was used to write the code), or written in multiple programming languages and each programming language may be undetermined or unknown. The set of code may be received or obtained from a code repository (e.g., the code repository 110 described with respect to FIG. 1).

At step 410, a pattern map of discovered string patterns is generated from the set code. The string patterns comprise words and linear combinations thereof in the set of code. The pattern map may be generated in a similar manner as described with respect to step 215 of FIGS. 2 and 3 including: (A) parsing and splitting the set of code by lines and by words, (B) generating a pattern map of words and linear combinations thereof (string patterns), which includes identifying the words and linear combinations thereof in each line, counting a number of times each word and each linear combination thereof is identified within the set of code to obtain count values of each word and each linear combination thereof, and flattening the pattern map by merging multiple instances of each word and each linear combination thereof into single instances based on the counting and associating the count values of each word and each linear combination thereof to the single instances of each word and each linear combination thereof, and (C) sorting the words and linear combinations thereof based on the count values. The end result of step 410 is a profile of the undetermined or unknown programming language(s) used to write the set of code exemplified by the pattern map generated from the set of code. The pattern map comprises: (i) the string patterns for each word and each linear combination thereof identified throughout the set of code; and (ii) the count value for each word and each linear combination thereof indicative of a number of occurrences for each word and each linear combination thereof throughout the set of code.

At step 415, the string patterns included within the pattern map are compared against learned programming language patterns included within a master voting map (generated in process 200 described with respect to FIG. 2) to identify one or more profiled programming languages that utilize the learned programming language patterns that match the string patterns, and a score card is generated for the set of code based on the comparison between the pattern map and master voting map. Principally, the code scanning tool compares the string patterns identified throughout the set of code against the learned programming language patterns within the mister voting map, and for each string pattern of the set of code that is found within the master voting map, the code scanning tool will keep a count in a score card of the point value for each programming language associated with the found string patterns. The tally of points is calculated using the weights (e.g., the full points and partial points) assigned to the various learned programming language patterns of the profiled programming languages in step 215 described with respect to FIG. 2. Accordingly, the score card provides a tally of points for various programming languages profiled within the master voting map that are associated with at least one string pattern discovered within the set of code.

The comparison includes comparing (i) each word and each linear combination thereof of the string patterns, against (ii) each word and each linear combination thereof of the learned programming language patterns, to identify the one or more profiled programming languages that utilize the learned programming language patterns that match the string patterns. For example, if the string patterns of the pattern map include "URLConnction" (624); "mySite openConnection" (516); and "println" (205), then the comparison process would compare those string patterns against the learned programming language patterns of the profiled programming languages to determine whether "URLConnection"; "mySite openConnection"; and "println" are within the learned programming language patterns of one or more profiled programming languages. The purpose of the comparison is to identify string patterns of the set of code (undetermined or unknown programming language) that are found within the learned programming language patterns of one or more profiled programming languages. In some instances, the comparison is thresholded based on count value such that only prevalent string patterns are searched for in the profiled programming languages. For example, a predetermined count value threshold of 10, 15, 20, etc. may be set for the comparison process such that only the string patterns with a count value equal to or greater than the predetermined count value threshold are compared against the learned programming language patterns of the profiled programming languages. This would constrain the comparison such that noise (those string patterns with a lower probability of being determinative of the programming language) are removed (e.g., a minor string pattern such as "gladiator" (1)) and only prevalent string patterns (those string patterns with a higher probability of being determinative of the programming language) are searched for in the profiled programming languages.

Figure 5:
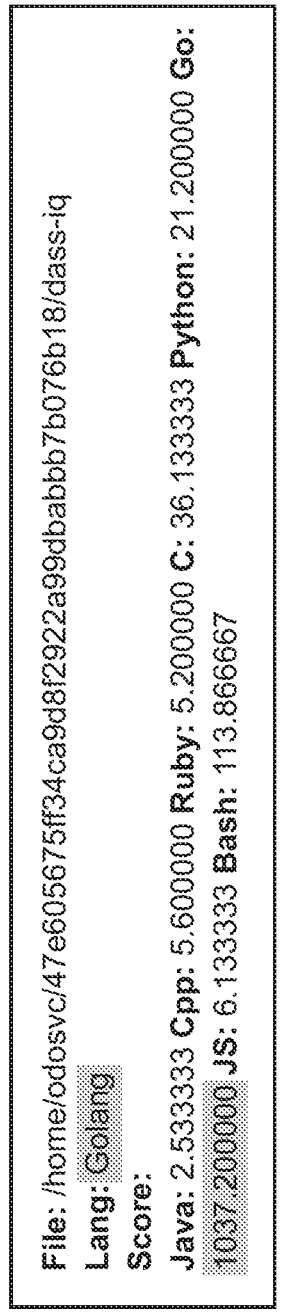
FIG. 5 depicts an exemplary score card in accordance with various embodiments.

The generating the score card includes tallying scores for the one or more profiled programming languages based on the comparing and the weights (e.g., the full, points and partial points) associated with the one or more profiled programming languages that utilize the learned programming language patterns that match the string patterns. In some instances, the tallying the scores for the one or more profiled programming languages comprises summing the weight associated with the one or more profiled programming languages that utilize the learned programming language patterns that match the string patterns. For example, if the comparison finds "URLConnection" from the pattern map within the master voting map, then the process determines how many points occurrence of the "URLConnection" is weighted for each programming language (e.g., weight of 1 for Java) and increments a total score in the score card for each programming language by the determined number of points (e.g., the total score for Java in the score card would be incremented by 1). FIG. 5 shows an exemplary score card from an evaluation of a set of code. Total scores for profiled programming languages Java, C++, Ruby, C, Python, Go, JavaScript, and Bash are illustrated. The profiled programming languages received points or partial points based on string patterns of the pattern map matching the learned programming language patterns of the master voting map, and the weights associated with the one or more profiled programming languages that utilize the learned programming language patterns that match the string patterns.

With reference back to FIG. 4, at step 420, a programming language for the set of code is determined based on the scores for profiled programming languages within the score card. In some instances, the profiled programming language having the highest score (e.g., Go programming language as illustrated in FIG. 5) is determined to be the programming language for the set of code. In other instances, the profiled programming language having the highest score is determined to be the primary programming language for the set of code and any other profited programming language having a score over a predetermined threshold is determined to be a secondary programming language for the set of code (e.g., a set of code that is predominantly Java with some Ruby mixed in for programming various components). In other instances, the programming language for the input set of code may be determined on a per file or folder level, e.g., a first folder of the set of code may be determine to be written in a first programming language based on folder level scores, and a second folder of the set of code may be determined to be written in a second programming language based on the folder level scores. As should be understood, other schemes may be implemented within the spirit and scope of the present disclosure to determine one or more programming languages for the set of code based on scores for profiled programming languages within the score card.

Illustrative Systems

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different problems for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more security group rules provisioned to define how the security of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 6:
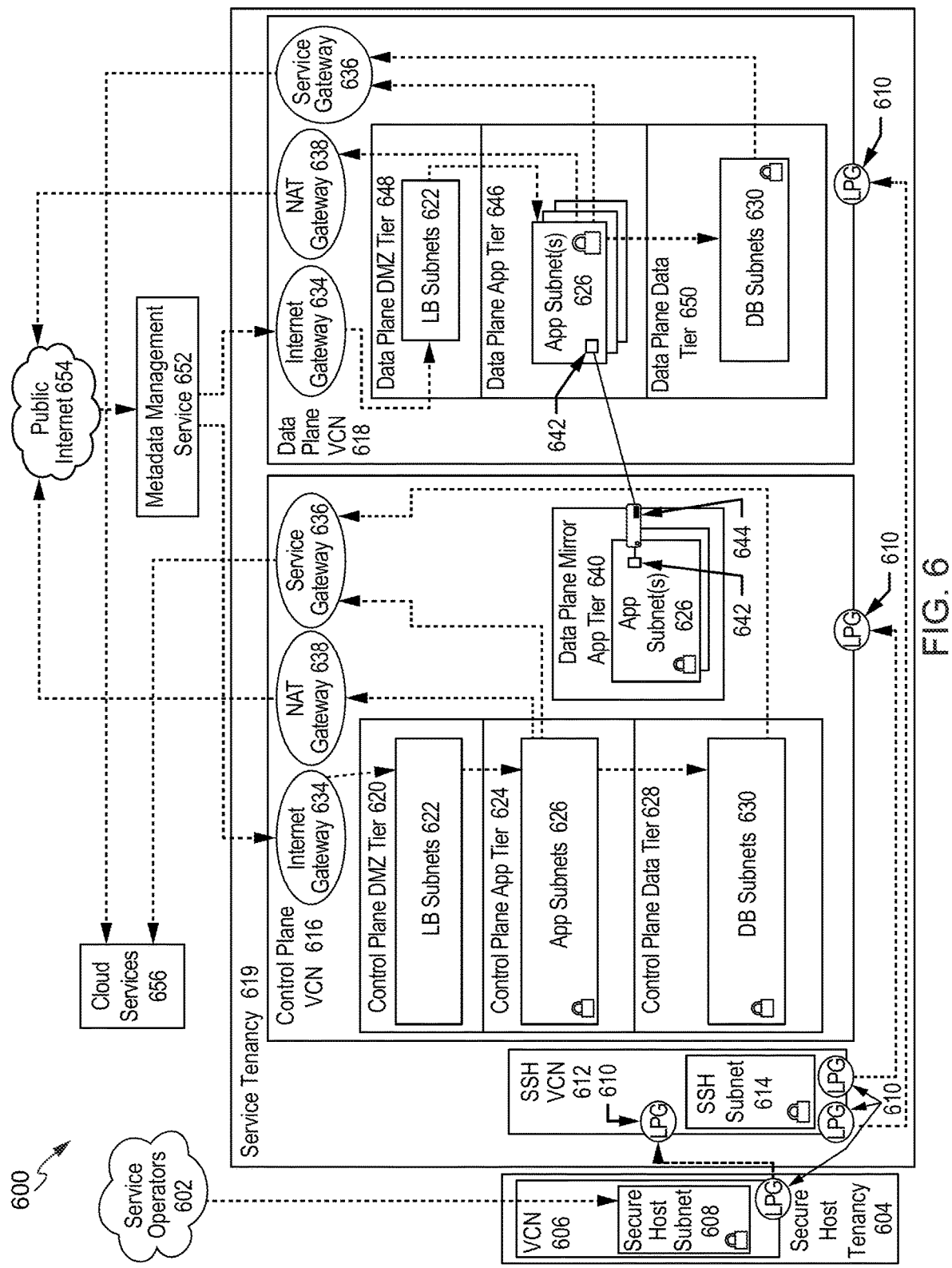
FIG. 6 is a block diagram illustrating one pattern for implementing a cloud infrastructure as a service system, in accordance with various embodiments.

FIG. 6 is a block diagram 600 illustrating an example pattern of an IaaS architecture, according to at least one embodiment. Service operators 602 can be communicatively coupled to a secure host tenancy 604 that can include a virtual cloud network (VCN) 606 and a secure host subnet 608. In some examples, the service operators 602 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 606 and/or the Internet.

The VCN 606 can include a local peering gateway (LPG) 610 that can be communicatively coupled to a secure shell (SSH) VCN 612 via an LPG 610 contained in the SSH VCN 612. The SSH VCN 612 can include an SSH subnet 614, and the SSH VCN 612 can be communicatively coupled to a Control plane VCN 616 via the LPG 610 contained in the control plane VCN 616. Also, the SSH VCN 612 can be communicatively coupled to a data plane VCN 618 via an LPG 610. The control plane VCN 616 and the data plane VCN 618 can be contained in a service tenancy 619 that can be owned and/or operated by the IaaS provider.

The control plane VCN 616 can include a control plane demilitarized zone (DMZ) tier 620 that acts as a perimeter network (e.g., portions of a corporate network between the corporate intranet and external networks). The DMZ-based servers may have restricted responsibilities and help keep security breaches contained. Additionally, the DMZ tier 620 can include one or more load balancer (LB) subnet(s) 622, a control plane app tier 624 that can include app subnet(s) 626, a control plane data tier 628 that can include database (DB) subnet(s) 630 (e.g., frontend DB subnet(s) and/or backend DB subnet(s)). The LB subnet(s) 622 contained in the control plane DMZ tier 620 can be communicatively coupled to the app subnet(s) 626 contained in the control plane app tier 624 and an Internet gateway 634 that can be contained in the control plane VCN 616, and the app subnet(s) 626 can be communicatively coupled to the DB subnet(s) 630 contained in the control plane data tier 628 and a service gateway 636 and a network address translation (NAT) gateway 638. The control plane VCN 616 can include the service gateway 636 and the NAT gateway 638.

The control plane VCN 616 can include a data plane mirror app tier 640 that can include app subnet(s) 626. The app subnet(s) 626 contained in the data plane mirror app tier 640 can include a virtual network interface controller (VNIC) 642 that can execute a compute instance 644. The compute instance 644 can communicatively couple the app subnet(s) 625 of the data plane minor app tier 640 to app subnet(s) 626 that can be contained in a data plane app tier 646.

The data plane VCN 618 can include the data plane app tier 646, a data plane DMZ tier 648, and a data plane data tier 650. The data plane DMZ tier 648 can include LB subnet(s) 622 that can be communicatively coupled to the app subnet(s) 626 of the data plane app tier 646 and the Internet gateway 634 of the data plane VCN 618. The app subnet(s) 626 can be communicatively coupled to the service gateway 636 of the data plane VCN 618 and the NAT gateway 638 of the data plane VCN 618. The data plane data tier 650 can also include the DB subnet(s) 630 that can be communicatively coupled to the app subnet(s) 626 of the data plane app tier 646.

The Internet gateway 634 of the control plane VCN 616 and of the data plane VCN 618 can be communicatively coupled to a metadata management service 652 that can be communicatively coupled to public Internet 654. Public Internet 654 can be communicatively coupled to the NAT gateway 638 of the control plane VCN 616 and of the data plane VCN 618. The service gateway 636 of the control plane VCN 616 and of the data plane VCN 618 can be communicatively couple to cloud services 656.

In some examples, the service gateway 636 of the control plane VCN 616 or of the data plan VCN 618 can make application programming interface (API) calls to cloud services 656 without going through public Internet 654. The API calls to cloud services 656 from the service gateway 636 can be one-way: the service gateway 636 can make API calls to cloud services 656, and cloud services 656 can send requested data to the service gateway 636. But, cloud services 656 may not initiate API calls to the service gateway 636.

In some examples, the secure host tenancy 604 can be directly connected to the service tenancy 619, which may be otherwise isolated. The secure host subnet 608 can communicate with the SSH subnet 614 through an LPG 610 that may enable two-way communication over an otherwise isolated system. Connecting the secure host subnet 608 to the SSH subnet 614 may give the secure host subnet 608 access to other entities within the service tenancy 619.

The control plane VCN 616 may allow users of the service tenancy 619 to set up or otherwise provision desired resources. Desired resources provisioned in the control plane VCN 616 may be deployed or otherwise used in the data plane VCN 618. In some examples, the control plane VCN 616 can be isolated from the data plane VCN 618, and the data plane mirror app tier 640 of the control plane VCN 616 can communicate with the data plane app tier 646 of the data plane VCN 618 via VNICs 642 that can be contained in the data plane mirror app tier 640 and the data plane app tier 646.

In some examples, users of the system, or customers, can make requests, for example create, read, update, or delete (CRUD) operations, through public Internet 654 that can communicate the requests to the metadata management service 652. The metadata management service 652 can communicate the request to the control plane VCN 616 through the Internet gateway 634. The request can be received by the LB subnet(s) 622 contained in the control plane DMZ tier 620. The LB subnet(s) 622 may determine that the request is valid, and in response to this determination, the LB subnet(s) 622 can transmit the request to app subnet(s) 626 contained in the control plane app tier 624. If the request is validated and requires a call to public Internet 654, the call to public Internet 654 may be transmitted to the NAT gateway 638 that can make the call to public Internet 654. Memory that may be desired to be stored by the request can be stored in the DB subnet(s) 630.

In some examples, the data plane mirror app tier 640 can facilitate direct communication between the control plane VCN 616 and the data plane VCN 618. For example, changes, updates, or other suitable modifications to configuration may be desired to be applied to the resources contained in the data plane VCN 618. Via a VNIC 642, the control plane VCN 616 can directly communicate with, and can thereby execute the changes, updates, or other suitable modifications to configuration to, resources contained in the data plane VCN 618.

In some embodiments, the control plane VCN 616 and the data plane VCN 618 can be contained in the service tenancy 619. In this case, the user, or the customer, of the system may not own or operate either the control plane VCN 616 or the data plane VCN 618. Instead, the IaaS provider may own or operate the control plane VCN 616 and the data plane VCN 618, both of which may be contained in the service tenancy 619. This embodiment can enable isolation of networks that may prevent users or customers from interacting with other users', or other customers', resources. Also, this embodiment may allow users or customers of the system to store databases privately without needing to rely on public Internet 654, which may not have a desired level of security, for storage.

In other embodiments, the LB subnet(s) 622 contained in the control plane VCN 616 can be configured to receive a signal from the service gateway 636. In this embodiment, the control plane VCN 616 and the data plane VCN 618 may be configured to be called by a customer of the IaaS provider without calling public Internet 654. Customers of the IaaS provider may desire this embodiment since database(s) that the customers use may be controlled by the IaaS provider and may be stored on the service tenancy 619, which may be isolated from public Internet 654.

Figure 7:
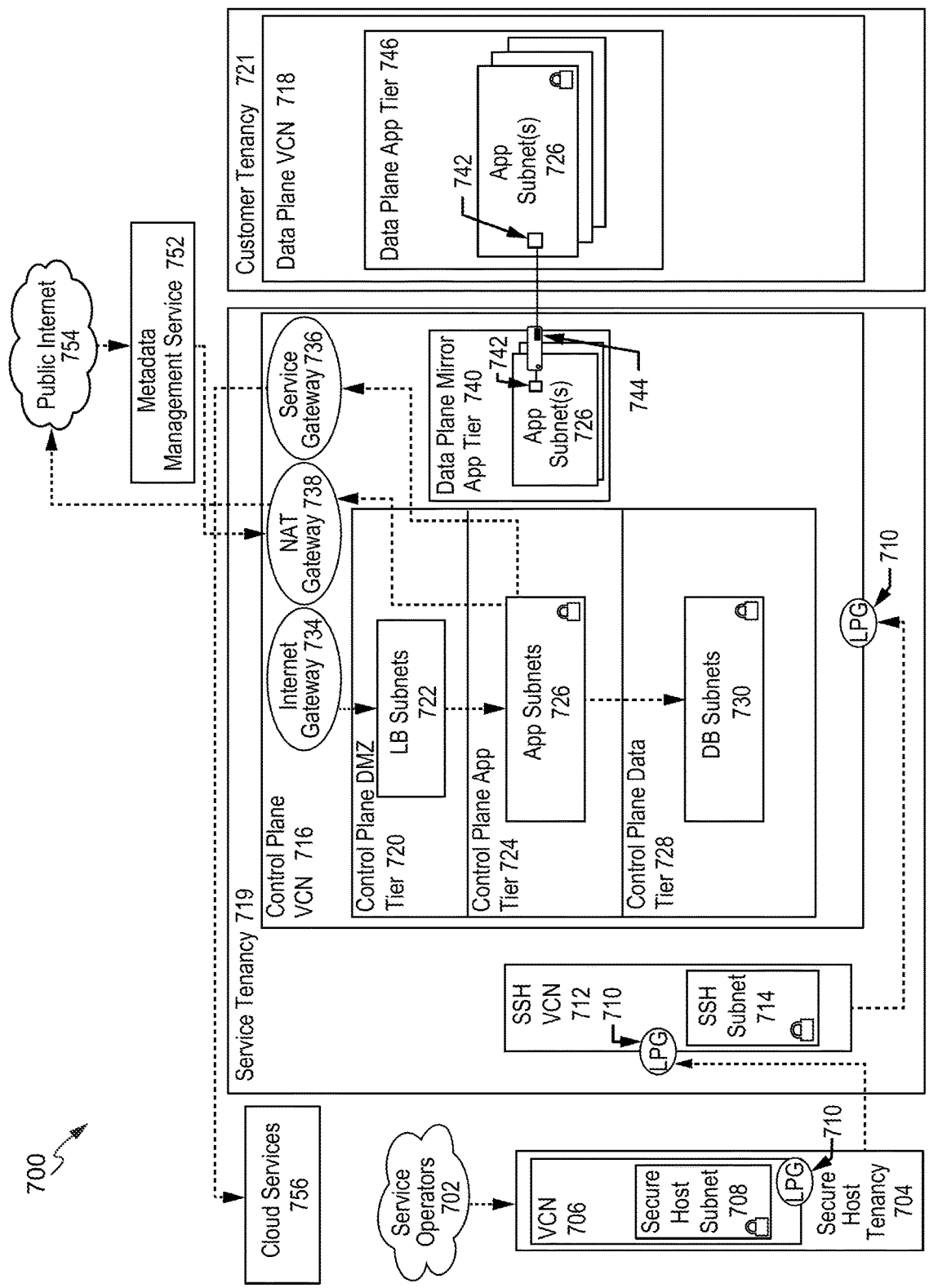
FIG. 7 is a block diagram illustrating another pattern for implementing a cloud infrastructure as a service system, in accordance with various embodiments.

FIG. 7 is a block diagram 700 illustrating another example pattern of an IaaS architecture, according to at least one embodiment. Service operators 702 (e.g. service operators 602 of FIG. 6) can be communicatively coupled to a secure host tenancy 704 (e.g. the secure host tenancy 604 of FIG. 6) that can include a virtual cloud network (VCN) 706 (e.g. the VCN 606 of FIG. 6) and a secure host subnet 708 (e.g. the secure host subnet 608 of FIG. 6). The VCN 706 can include a local peering gateway (LPG) 710 (e.g. the LPG 610 of FIG. 6) that can be communicatively coupled to a secure shell (SSH) VCN 712 (e.g. the SSH VCN 612 of FIG. 6) via an LPG 610 contained in the SSH VCN 712. The SSH VCN 712 can include an SSH subnet 714 (e.g. the SSH subnet 614 of FIG. 6), and the SSH VCN 712 can be communicatively coupled to a control plane VCN 716 (e.g. the control plane VCN 616 of FIG. 6) via an LPG 710 contained in the control plane VCN 716. The control plane VCN 716 can be contained in a service tenancy 719 (e.g. the service tenancy 619 of FIG. 6), and the data plane VCN 718 (e.g. the data plane VCN 618 of FIG. 6) can be contained in a customer tenancy 721 that may be owned or operated by users, or customers, of the system.

The control plane VCN 716 can include a control plane DMZ tier 720 (e.g. the control plane DMZ tier 620 of FIG. 6) that can include LB subnet(s) 722 (e.g. LB subnet(s) 622 of FIG. 6), a control plane app tier 724 (e.g. the control plane app tier 624 of FIG. 6) that can include app subnet(s) 726 (e.g. app subnet(s) 626 of FIG. 6), a control plane data tier 728 (e.g. the control plane data tier 628 of FIG. 6) that can include database (DB) subnet(s) 730 (e.g. similar to DB subnet(s) 630 of FIG. 6). The LB subnet(s) 722 contained in the control plane DMZ tier 720 can be communicatively coupled to the app subnet(s) 726 contained in the control plane app tier 724 and an Internet gateway 734 (e.g. the Internet gateway 634 of FIG. 6) that can be contained in the control plane VCN 716, and the app subnet(s) 726 can be communicatively coupled to the DB subnet(s) 730 contained in the control plane data tier 728 and a service gateway 736 (e.g. the service gateway of FIG. 6) and a network address translation (NAT) gateway 738 (e.g. the NAT gateway 638 of FIG. 6). The control plane VCN 716 can include the service gateway 736 and the NAT gateway 738.

The control plane VCN 716 can include a data plane mirror app tier 740 (e.g. the data plane mirror app tier 640 of FIG. 6) that can include app subnet(s) 726. The app subnet(s) 726 contained in the data plane mirror app tier 740 can include a virtual network interface controller (VNIC) 742 (e.g. the VNIC of 642) that can execute a compute instance 744 (e.g. similar to the compute instance 644 of FIG. 6). The compute instance 744 can facilitate communication between the app subnet(s) 726 of the data plane mirror app tier 740 and the app subnet(s) 726 that can be contained in a data plane app tier 746 (e.g. the data plane app tier 646 of FIG. 6) via the VNIC 742 contained in the data plane mirror app tier 740 and the VNIC 742 contained in the data plan app tier 746.

The Internet gateway 734 contained in the control, plane VCN 716 can be communicatively coupled to a metadata management service 752 (e.g. the metadata management service 652 of FIG. 6) that can be communicatively coupled to public Internet 754 (e.g. public Internet 654 of FIG. 6). Public Internet 754 can be communicatively coupled to the NAT gateway 738 contained in the control plane VCN 716. The service gateway 736 contained in the control plane VCN 716 can be communicatively couple to cloud services 756 (e.g. cloud services 656 of FIG. 6).

In some examples, the data plane VCN 718 can be contained in the customer tenancy 721. In this case, the IaaS provider may provide the control plane VCN 716 for each customer, and the IaaS provider may, for each customer, set up a unique compute instance 744 that is contained in the service tenancy 719. Each compute instance 744 may allow communication between the control plane VCN 716, contained in the service tenancy 719, and the data plane VCN 718 that is contained in the customer tenancy 721. The compute instance 744 may allow resources, that are provisioned in the control plane VCN 716 that is contained in the service tenancy 719, to be deployed or otherwise used in the data plane VCN 718 that is contained in the customer tenancy 721.

In other examples, the customer of the IaaS provider may have databases that live in the customer tenancy 721. In this example, the control plane VCN 716 can include the data plane mirror app tier 740 that can include app subnet(s) 726. The data plane mirror app tier 740 can reside in the data plane VCN 718, but the data plane mirror app tier 740 may not live in the data plane VCN 718. That is, the data plane mirror app tier 740 may have access to the customer tenancy 721, but the data plane mirror app tier 740 may not exist in the data plane VCN 718 or be owned or operated by the customer of the IaaS provider. The data plane mirror app tier 740 may be configured to make calls to the data plane VCN 718 but may not be configured to make calls to any entity contained in the control plane VCN 716. The customer may desire to deploy or otherwise use resources in the data plane VCN 718 that are provisioned in the control plane VCN 716, and the data plane mirror app tier 740 can facilitate the desired deployment, or other usage of resources, of the customer.

In some embodiments, the customer of the IaaS provider can apply filters to the data plane VCN 718. In this embodiment, the customer can determine what the data plane VCN 718 can access, and the customer may restrict access to public Internet 754 from the data plane VCN 718. The IaaS provider may not be able to apply filters or otherwise control access of the data plane VCN 718 to any outside networks or databases. Applying filters and controls by the customer onto the data plane VCN 718, contained in the customer tenancy 721, can help isolate the data plane VCN 718 from other customers and from public Internet 754.

In some embodiments, cloud services 756 can be called by the service gateway 736 to access services that may not exist on public Internet 754, on the control plane VCN 716, or on the data plane VCN 718. The connection between cloud services 756 and the control plane VCN 716 or the data plane VCN 718 may not be live or continuous. Cloud services 756 may exist on a different network owned or operated by the IaaS provider. Cloud services 756 may be configured to receive calls from the service gateway 736 and may be configured to not receive calls from public Internet 754. Some cloud services 756 may be isolated from other cloud services 756, and the control plane VCN 716 may be isolated from cloud services 756 that may not be in the same region as the control plane VCN 716. For example, the control plane VCN 716 may be located in "Region 1," and cloud service "Deployment 6," may be located in Region 1 and in "Region 2." If a call to Deployment 6 is made by the service gateway 736 contained in the control plane VCN 716 located in Region 1, the call may be transmitted to Deployment 6 in Region 1. In this example, the control plane VCN 716, or Deployment 6 in Region 1, may not be communicatively coupled to, or otherwise in communication with, Deployment 6 in Region 2.

Figure 8:
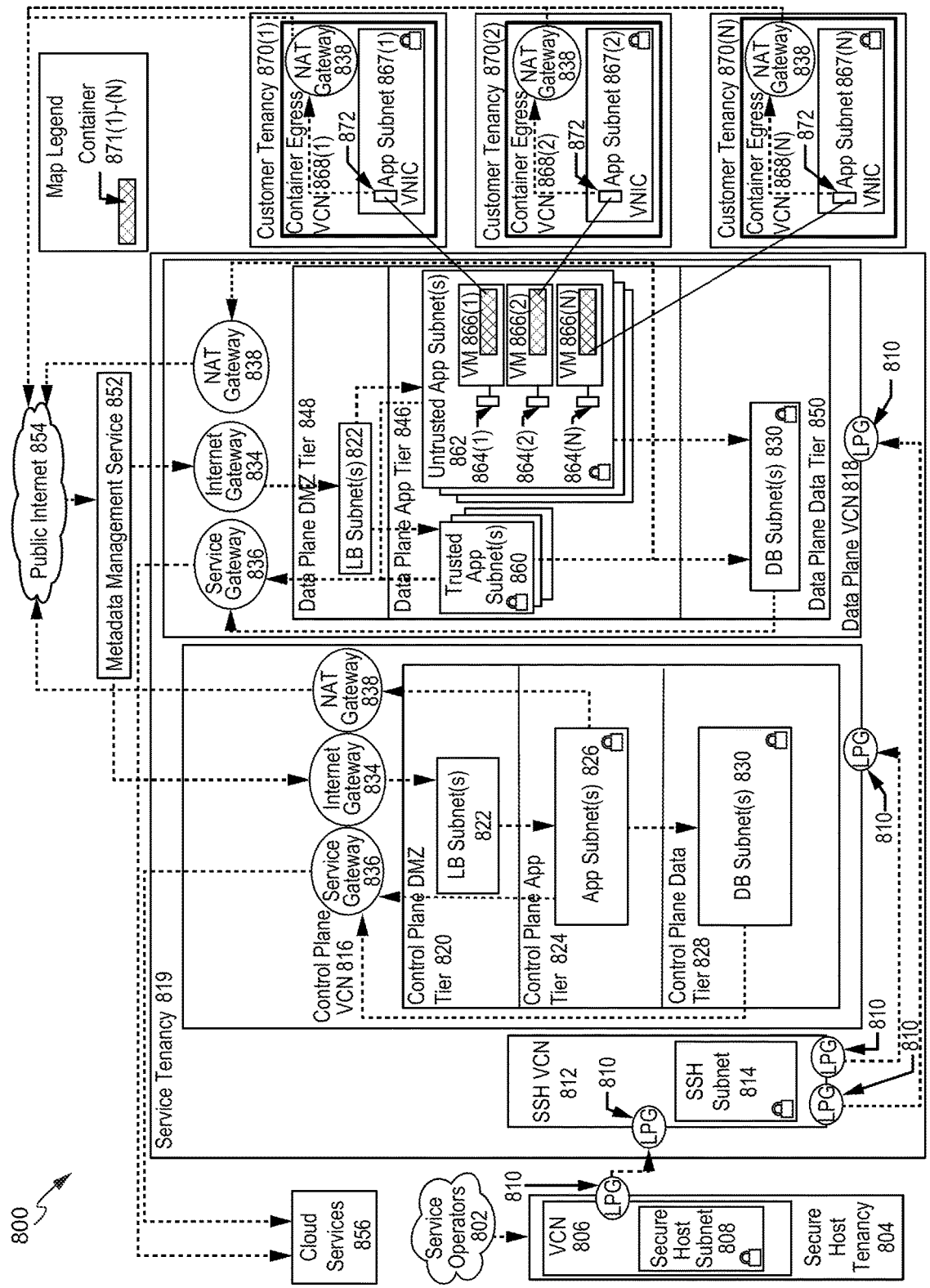
FIG. 8 is a block diagram illustrating another pattern for implementing a cloud infrastructure as a service system, in accordance with various embodiments.

FIG. 8 is a block diagram 800 illustrating another example pattern of an IaaS architecture, according to at least one embodiment. Service operators 802 (e.g. service operators 602 of FIG. 6) can be communicatively coupled to a secure host tenancy 804 (e.g. the secure host tenancy 604 of FIG. 6) that can include a virtual cloud network (VCN) 806 (e.g. the VCN 606 of FIG. 6) and a secure host subnet 808 (e.g. the secure host subnet 608 of FIG. 6). The VCN 806 can include an LPG 810 (e.g. the LPG 610 of FIG. 6) that can be communicatively coupled to an SSH VCN 812 (e.g. the SSH VCN 612 of FIG. 6) via an LPG 810 contained in the SSH VCN 812. The SSH VCN 812 can include an SSH subnet 814 (e.g. the SSH subnet 614 of FIG. 6), and the SSH VCN 812 can be communicatively coupled to a control plane VCN 816 (e.g. the control plane VCN 616 of FIG. 6) via an LPG 810 contained in the control plane VCN 816 and to a data plane VCN 818 (e.g. the data plane 618 of FIG. 6) via an LPG 810 contained in the data plane VCN 818. The control plane VCN 816 and the data plane VCN 818 can be contained in a service tenancy 819 (e.g. the service tenancy 619 of FIG. 6).

The control plane VCN 816 can include a control plane DMZ tier 820 (e.g. the control plane DMZ tier 620 of FIG. 6) that can include load balancer (LB) subnet(s) 822 (e.g. LB subset(s) 622 of FIG. 6), a control plane app tier 824 (e.g. the control plane app tier 624 of FIG. 6) that can include app subnet(s) 826 (e.g. similar to app subnet(s) 626 of FIG. 6), a control plane data tier 828 (e.g. the control plane data tier 628 of FIG. 6) that can include DB subnet(s) 830. The LB subnet(s) 822 contained in the control plane DMZ tier 820 can be communicatively coupled to the app subnet(s) 826 contained in the control plane app tier 824 and to an Internet gateway 834 (e.g. the Internet gateway 634 of FIG. 6) that can be contained in the control plane VCN 816, and the app subnet(s) 826 can be communicatively coupled to the DB subnet(s) 830 contained in the control plane data tier 828 and to a service gateway 836 (e.g. the service gateway of FIG. 6) and a network address translation (NAT) gateway 838 (e.g. the NAT gateway 638 of FIG. 6). The control plane VCN 816 can include the service gateway 836 and the NAT gateway 838.

The data plane VCN 818 can include a data plane app tier 846 (e.g. the data plane app tier 646 of FIG. 6), a data plane DMZ tier 848 (e.g. the data plane DMZ tier 648 of FIG. 6), and a data plane data tier 850 (e.g. the data plane data tier 550 of FIG. 6) The data plane DMZ tier 848 can include LB subnet(s) 822 that can be communicatively coupled to trusted app subnet(s) 860 and untrusted app subnet(s) 862 of the data plane app tier 846 and the Internet gateway 834 contained in the data plane VCN 818. The trusted app subnet(s) 860 can be communicatively coupled to the service gateway 836 contained in the data plane VCN 818, the NAT gateway 838 contained in the data plane VCN 818, and DB subnet(s) 830 contained in the data plane data tier 850. The untrusted app subnet(s) 862 can be communicatively coupled to the service gateway 836 contained in the data plane VCN 818 and DB subnet(s) 830 contained in the data plane data tier 850. The data plane data tier 850 can include DB subnet(s) 830 that can be communicatively coupled to the service gateway 836 contained in the data plane VCN 818.

The untrusted app subnet(s) 862 can include one or more primary VNICs 864(1)-(N) that can be communicatively coupled to tenant virtual machines (VMs) 866(1)-(N). Each tenant VM 866(1)-(N) can be communicatively coupled to a respective app subnet 867(1)-(N) that can be contained in respective container egress VCNs 868(1)-(N) that can be contained in respective customer tenancies 870(1)-(N). Respective secondary VNICs 872(1)-(N) can facilitate communication between the untrusted app subnet(s) 862 contained in the data plane VCN 818 and the app subnet contained in the container egress VCNs 868(1)-(N). Each container egress VCNs 868(1)-(N) can include a NAT gateway 838 that can be communicatively coupled to public Internet 854 (e.g. public Internet 654 of FIG. 6).

The Internet gateway 834 contained in the control plane VCN 816 and contained in the data plane VCN 818 can be communicatively coupled to a metadata management service 852 (e.g. the metadata management system 652 of FIG. 6) that can be communicatively coupled to public Internet 854. Public Internet 854 can be communicatively coupled to the NAT gateway 838 contained in the control plane VCN 816 and contained in the data plane VCN 818. The service gateway 836 contained in the control plane VCN 816 and contained in the data plane VCN 818 can be communicatively couple to cloud services 856.

In some embodiments, the data plane VCN 818 can be integrated with customer tenancies 870. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 846. Code to run the function may be executed in the VMs 866(1)-(N), and the code may not be configured to run anywhere else on the data plane VCN 818. Each VM 866(1)-(N) may be connected to one customer tenancy 870. Respective containers 871(1)-(N) contained in the VMs 866(1)-(N) may be configured to run the code. In this case, there can be a dual isolation (e.g., the containers 871(1)-(N) running code, where the containers 871(1)-(N) may be contained in at least the VM 866(1)-(N) that are contained in the untrusted app subnet(s) 862), which may help prevent incorrect or otherwise undesirable code from damaging the network of the IaaS provider or from damaging a network of a different customer. The containers 871(1)-(N) may be communicatively coupled to the customer tenancy 870 and may be configured to transmit or receive data from the customer tenancy 870. The containers 871(1)-(N) may not be configured to transmit or receive data from any other entity in the data plane VCN 818. Upon completion of running the code, the IaaS provider may kill or otherwise dispose of the containers 871(1)-(N).

In some embodiments, the trusted app subnet(s) 860 may run code that may be owned or operated by the IaaS provider. In this embodiment, the trusted app subnet(s) 860 may be communicatively coupled to the DB subnet(s) 830 and be configured to execute CRUD operations in the DB subnet(s) 830. The untrusted app subnet(s) 862 may be communicatively coupled to the DB subnet(s) 830, but in this embodiment, the untrusted app subnet(s) may be configured to execute read operations in the DB subnet(s) 830. The containers 871(1)-(N) that can be contained in the VM 866(1)-(N) of each customer and that may run code from the customer may not be communicatively coupled with the DB subnet(s) 830.

In other embodiments, the control plane VCN 816 and the data plane VCN 818 may not be directly communicatively coupled. In this embodiment, there may be no direct communication between the control plane VCN 816 and the data plane VCN 818. However, communication can occur indirectly through at least one method. An LPG 810 may be established by the IaaS provider that can facilitate communication between the control plane VCN 816 and the data plane VCN 818. In another example, the control plane VCN 816 or the data plane VCN 818 can make a call to cloud services 856 via the service gateway 836. For example, a call to cloud services 856 from the control plane VCN 816 can include a request for a service that can communicate with the data plane VCN 818.

Figure 9:
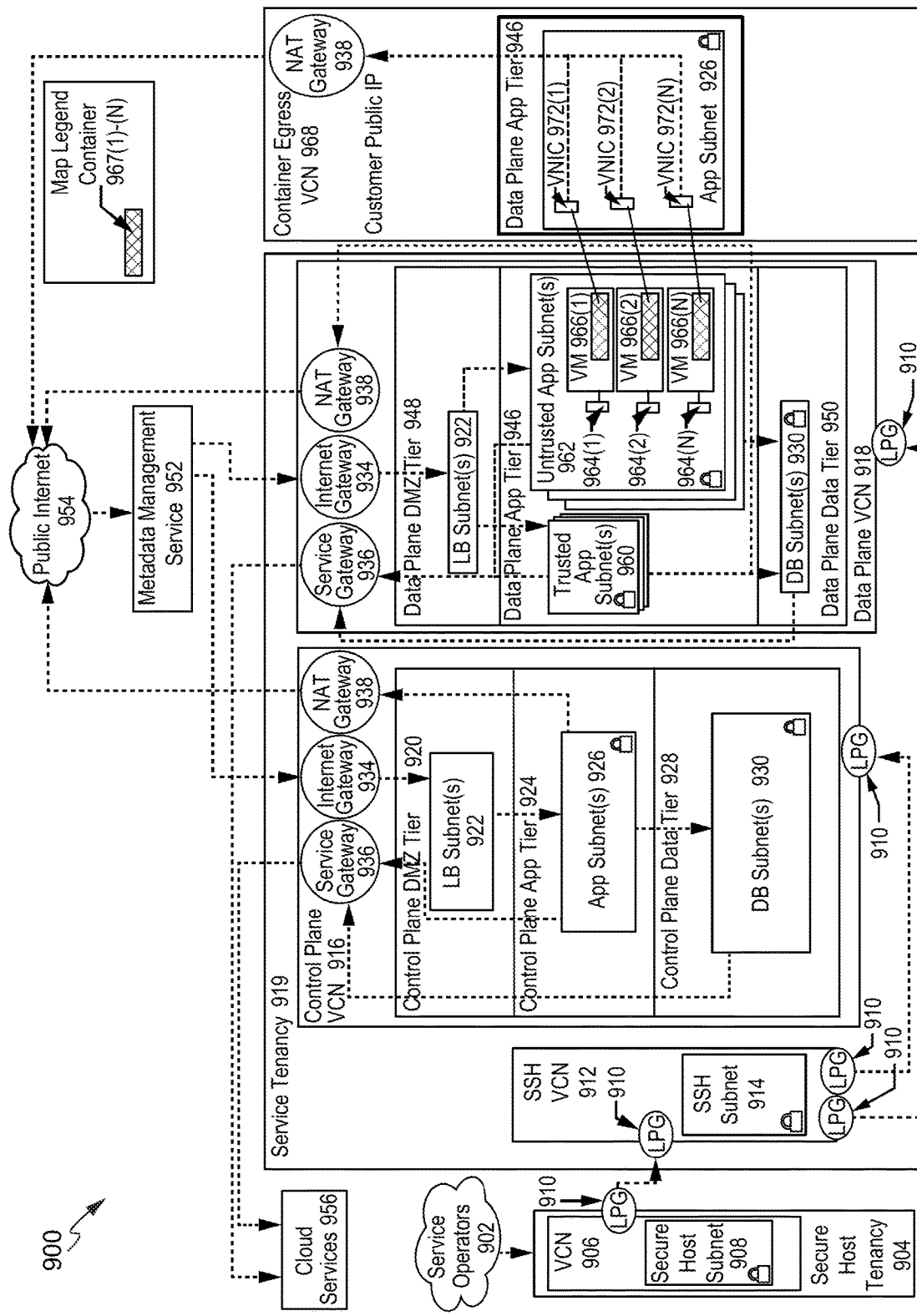
FIG. 9 is a block diagram illustrating another pattern for implementing a cloud infrastructure as a service system in accordance with various embodiments.

FIG. 9 is a block diagram 900 illustrating another example pattern of an IaaS architecture, according to at least one embodiment. Service operators 902 (e.g. service operators 602 of FIG. 6) can be communicatively coupled to a secure host tenancy 904 (e.g. the secure host tenancy 604 of FIG. 6) that can include a virtual cloud network (VCN) 906 (e.g. the VCN 606 of FIG. 6) and a secure host subnet 908 (e.g. the secure host subnet 608 of FIG. 6). The VCN 906 can include an LPG 910 (e.g. the LPG 610 of FIG. 6) that can be communicatively coupled to an SSH VCN 912 (e.g. the SSH VCN 612 of FIG. 6) via an LPG 910 contained in the SSH VCN 912. The SSH VCN 912 can include an SSH subnet 914 (e.g. the SSH subnet 614 of FIG. 6), and the SSH VCN 912 can be communicatively coupled to a control plane VCN 916 (e.g. the control plane VCN 616 of FIG. 6) via an LPG 910 contained in the control plane VCN 916 and to a data plane VCN 918 (e.g. the data plane 618 of FIG. 6) via an LPG 910 contained in the data plane VCN 918. The control plane VCN 916 and the data plane VCN 918 can be contained in a service tenancy 919 (e.g. the service tenancy 619 of FIG. 6).

The control plane VCN 916 can include a control plane DMZ tier 920 (e.g. the control plane DMZ tier 620 of FIG. 6) that can include LB subnet(s) 922 (e.g., LB subnet(s) 622 of FIG. 6), a control plane app tier 924 (e.g. the control plane app tier 624 of FIG. 6) that can include app subnet(s) 926 (e.g. app subnet(s) 626 of FIG. 6), a control plane data tier 928 (e.g. the control plane data tier 628 of FIG. 6) that can include DB subnet(s) 930 (e.g. DB subnet(s) 830 of FIG. 8). The LB subnet(s) 922 contained in the control plane DMZ tier 920 can be communicatively coupled to the app subnet(s) 926 contained in the control plane app tier 924 and to an Internet gateway 934 (e.g. the Internet gateway 634 of FIG. 6) that can be contained in the control plane VCN 916, and the app subnet(s) 926 can be communicatively coupled to the DB subnet(s) 930 contained in the control plane data tier 928 and to a service gateway 936 (e.g. the service gateway of FIG. 6) and a network address translation (NAT) gateway 938 (e.g. the NAT gateway 638 of FIG. 6). The control plane VCN 916 can include the service gateway 936 and the NAT gateway 938.

The data plane VCN 918 can include a data plane app tier 946 (e.g. the data plane app tier 646 of FIG. 6), a data plane DMZ tier 948 (e.g. the data plane DMZ tier 648 of FIG. 6), and a data plane data tier 950 (e.g. the data plane data tier 650 of FIG. 6). The data plane DMZ tier 948 can include LB subnet(s) 922 that can be communicatively coupled to trusted app subnet(s) 960 (e.g. trusted app subnet(s) 860 of FIG. 8) and untrusted app subnet(s) 962 (e.g. untrusted app subnet(s) 862 of FIG. 8) of the data plane app tier 946 and the Internet gateway 934 contained in the data plane VCN 918. The trusted app subnet(s) 960 can be communicatively coupled to the service gateway 936 contained in the data plane VCN 918, the NAT gateway 938 contained in the data plane VCN 918, and DB subnet(s) 930 contained in the data plane data tier 950. The untrusted app subnet(s) 962 can be communicatively coupled to the service gateway 936 contained in the data plane VCN 918 and DB subnet(s) 930 contained in the data plane data tier 950. The data plane data tier 950 can include DB subnet(s) 930 that can be communicatively coupled to the service gateway 936 contained in the data plane VCN 918.

The untrusted app subnet(s) 962 can include primary VNICs 964(1)-(N) that can be communicatively coupled to tenant virtual machines (VMs) 966(1)-(N) residing within the untrusted app subnet(s) 962. Each tenant VM 966(1)-(N) can run code in a respective container 967(1)-(N), and be communicatively coupled to an app subnet 926 that can be contained in a data plane app tier 946 that can be contained in a container egress VCN 968. Respective secondary VNICs 972(1)-(N) can facilitate communication between the untrusted app subnet(s) 962 contained in the data plane VCN 918 and the app subnet contained in the container egress VCN 968. The container egress VCN can include a NAT gateway 938 that can be communicatively coupled to public Internet 954 (e.g. public Internet 654 of FIG. 6).

The Internet gateway 934 contained in the control plane VCN 916 and contained in the data plane VCN 918 can be communicatively coupled to a metadata management service 952 (e.g. the metadata management system 652 of FIG. 6) that can be communicatively coupled to public Internet 954. Public Internet 954 can be communicatively coupled to the NAT gateway 938 contained in the control plane VCN 916 and contained in the data plane VCN 918. The service gateway 936 contained in the control plane VCN 916 and contained in the data plane VCN 918 can be communicatively couple to cloud services 956.

In some examples, the pattern illustrated by the architecture of block diagram 900 of FIG. 9 may be considered an exception to the pattern illustrated by the architecture of block diagram 800 of FIG. 8 and may be desirable for a customer of the IaaS provider if the IaaS provider cannot directly communicate with the customer (e.g., a disconnected region). The respective containers 967(1)-(N) that are contained in the VMs 966(1)-(N) for each customer can be accessed in real-time by the customer. The containers 967(1)-(N) may be configured to make calls to respective secondary VNICs 972(1)-(N) contained in app subnet(s) 926 of the data plane app tier 946 that can be contained in the container egress VCN 968. The secondary VNICs 972(1)-(N) can transmit the calls to the NAT gateway 938 that may transmit the calls, to public Internet 954. In this example, the containers 967(1)-(N) that can be accessed in real-time by the customer can be isolated from the control plane VCN 916 and can be isolated from other entities contained in the data plane VCN 918. The containers 967(1)-(N) may also be isolated from resources from other customers.

In other examples, the customer can use the containers 967(1)-(N) to call cloud services 956. In this example, the customer may run code in the containers 967(1)-(N) that requests a service from cloud services 956. The containers 967(1)-(N) can transmit this request to the secondary VNICs 972(1)-(N) that can transmit the request to the NAT gateway that can transmit the request to public Internet 954. Public Internet 954 can transmit the request to LB subnet(s) 922 contained in the control plane VCN 916 via the Internet gateway 934. In response to determining the request is valid, the LB subnet(s) can transmit the request to app subnet(s) 926 that can transmit the request to cloud services 956 via the service gateway 936.

It should be appreciated that IaaS architectures 600, 700, 800, 900 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 10:
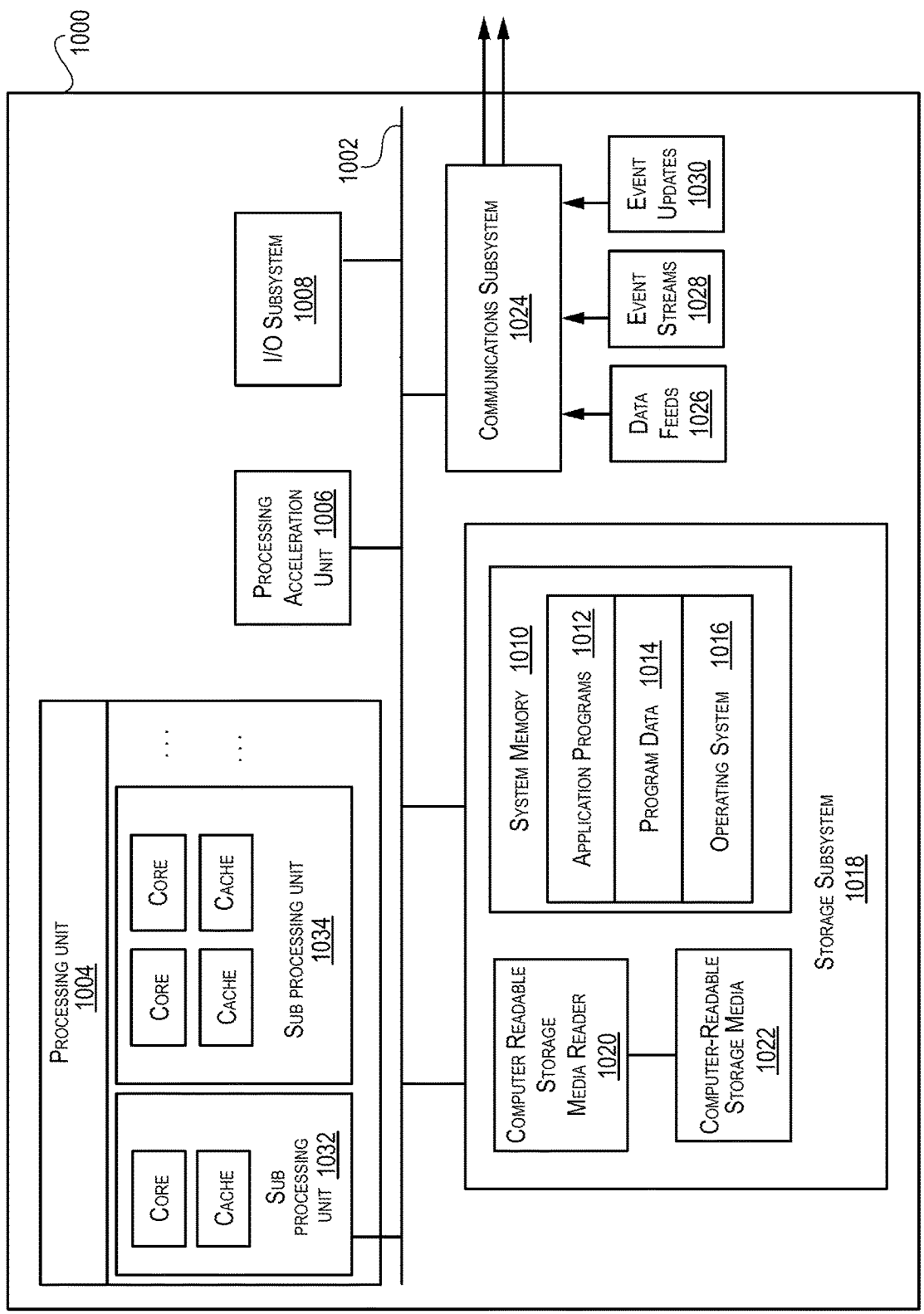
FIG. 10 is a block diagram illustrating an example computer system, in accordance with various embodiments.

FIG. 10 illustrates an example computer system 1000, in which various embodiments of the present disclosure may be implemented. The system 1000 may be used to implement any of the computer systems described above. As shown in the figure, computer system 1000 includes a processing unit 1004 that communicates with a number of peripheral subsystems via a bus subsystem 1002. These peripheral subsystems may include a processing acceleration unit 1006, an I/O subsystem 1008, a storage subsystem 1018 and a communications subsystem 1024. Storage subsystem 1018 includes tangible computer-readable storage media 1022 and a system memory 1010.

Bus subsystem 1002 provides a mechanism for letting the various components and subsystems of computer system 1000 communicate, with each other as intended. Although bus subsystem 1002 is shown schematically as a single bus, alternative embodiments of the bus subsystem may utilize multiple buses. Bus subsystem 1002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1004, which can be implemented as one or more integrated circuits (e.g., a conventional microprocessor or microcontroller), controls the operation of computer system 1000. One or more processors may be included in processing unit 1004. These processors may include single core or multicore processors. In certain embodiments, processing unit 1004 may be implemented as one or more independent processing units 1032 and/or 1034 with single or multicore processors included in each processing unit. In other embodiments, processing unit 1004 may also be implemented as a quad-core processing unit formed by integrating two dual-core processors into a single chip.

In various embodiments, processing unit 1004 can execute a variety of programs in response to program code and can maintain multiple concurrently executing programs or processes. At any given time, some or all of the program code to be executed can be resident in processor(s) 1004 and/or in storage subsystem 1018. Through suitable programming, processor(s) 1004 can provide various functionalities described above. Computer system 1000 may additionally include a processing acceleration unit 1006, which can include a digital signal processor (DSP), a special-purpose processor, and/or the like.

I/O subsystem 1008 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture, recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1000 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1000 may comprise a storage subsystem 101 that comprises software elements, shown as being currently located within a system memory 1010. System memory 1010 may store program instructions that are loadable and executable on processing unit 1004, as well as data generated during the execution of these programs.

Depending on the configuration and type of computer system 1000, system memory 1010 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1004. In some implementations, system memory 1010 may include multiple different types of memory, such as static random access memory (SRAM) or dynamic random access memory (DRAM). In some implementations, a basic input/output system (BIOS), containing the basic routines that help to transfer information between elements within computer system 1000, such as during start-up, may typically be stored in the ROM. By way of example, and not limitation, system memory 1010 also illustrates application programs 1012, may include client applications, Web browsers, mid-tier applications, relational database management systems (RDBMS), etc., program data 1014, and an operating system 1016. By way of example, operating system 1016 may include various versions of Microsoft Windows®, Apple Macintosh®, and/or Linux operating systems, a variety of commercially-available UNIX® UNIX-like operating systems (including without limitation the variety of GNU/Linus operating systems, the Google Chrome® OS, and the like) and/or mobile operating systems such as iOS, Windows® Phone, Android® OS BlackBerry® 10 OS and Palm® OS operating systems.

Storage subsystem 1018 may also provide a tangible computer-readable storage medium for storing the basic programming and data constructs that provide the functionality of some embodiments. Software (programs, code modules, instructions) that when executed by a processor provide the functionality described above may be stored in storage subsystem 1018. These software modules or instructions may be executed by processing unit 1004. Storage subsystem 1018 may also provide a repos for storing data used in accordance with the present disclosure.

Storage subsystem 1000 may also include a computer-readable storage media reader 1020 that can further be connected to computer-readable storage media 1022. Together and, optionally, in combination with system memory 1010, computer-readable storage media 1022 may comprehensively represent remote, local, fixed, and/or removable storage devices plus storage media for temporarily and/or more permanently containing, storing, transmitting, and retrieving computer-readable information.

Computer-readable storage media 1022 containing code, portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media, such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1000.

By way of example, computer-readable storage media 1022 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1000.

Communications subsystem 1024 provides an interface to other computer systems and networks. Communications subsystem 1024 serves as an interface for receiving data from and transmitting data to other systems from computer system 1000. For example, communications subsystem 1024 may enable computer system 1000 to connect to one or more devices via the Internet. In some embodiments communications subsystem 1024 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1024 can provide wired network connectivity (e.g., Ethernet) in addition to or instead of a wireless interface.

In some embodiments, communications subsystem 1024 may also receive input communication in the form of structured and/or unstructured data feeds 1026, event streams 1028, event updates 1030, and the like on behalf of one or more users who may use computer system 1000.

By way of example, communications subsystem 1024 may be configured to receive data feeds 1026 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1024 may also be configured to receive data in the form of continuous data streams, which may include event streams 1028 of real-time events and/or event updates 1030, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1024 may also be configured to output the structured and/or unstructured data feeds 1026, event streams 1028, event updates 1030, and the like to one or more databases that may be in communication with one or more streaming data source computers coupled to computer system 1000.

Computer system 1000 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing, system.

Due to the ever-changing nature of computers and networks, the description of computer system 1000 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments of the disclosure have been described, various modifications, alterations, alternative. constructions, and equivalents are also encompassed within the scope of the disclosure. Embodiments of the present disclosure are not restricted to operation within certain specific data processing environments, but are free to operate within a plurality of data processing environments. Additionally, although embodiments of the present disclosure have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments of the present disclosure have been described using a particular combination of hardware and software, it should be recognized that other combinations of hardware and software are also within the scope of the present disclosure. Embodiments of the present disclosure may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method comprising:

receiving, by a data processing system, a set of code;

generating, by the data processing system, a pattern map of discovered string patterns from the set of code, wherein the string patterns comprise words and linear combinations thereof in the set of code, wherein the generating the pattern map comprises:

parsing and splitting the set of code by lines and by words;

identifying the words and linear combinations thereof in each line;

counting a number of times each word and each linear combination thereof is identified within the set of code to obtain count values of each word and each linear combination thereof:

flattening the pattern map by merging multiple instances of each word and each linear combination thereof into single instances based on the counting and associating the count values of each word and each linear combination thereof to the single instances of each word and each linear combination thereof; and sorting the single instances of each word and each linear combination thereof based on the count values;

comparing, by the data processing system, the string patterns included within the pattern map against learned programming language patterns included within a master voting map to identify one or more profiled programming languages that utilize the learned programming language patterns that match the string patterns, wherein the master voting map comprises for each learned programming language pattern, a first weight or a second weight associated with the one or more profiled programming languages that utilize the learned programming language pattern;

generating, by the data processing system, a score card for the set of code, wherein the generating comprises tallying scores for the one or more profiled programming languages based on the comparing and the first weight or the second weight associated with the one or more profiled programming languages that utilize the learned programming language patterns that match the string patterns, and recording the scores with the one or more profiled programming languages in the score card; and determining, by the data processing system, one or more programming languages used to write the set of code based on the score card.

2. The method of claim 1, wherein the pattern map comprises: (i) the string patterns for each word and each linear combination thereof identified throughout the set of code; and (ii) the count value for each word and each linear combination thereof indicative of a number of occurrences for each word and each linear combination thereof throughout the set of code.

3. The method of claim 1, wherein:

the learned programming language patterns comprise words and linear combinations thereof in the one or more profiled programming languages;

the comparing the string patterns included within the pattern map against the learned programming language patterns included within the master voting map, comprises: comparing (i) each word and each linear combination thereof of the string patterns that has a count value equal to or greater than a predetermined threshold, against (ii) each word and each linear combination thereof of the learned programming language patterns, to identify the one or more profiled programming languages that utilize the learned programming language patterns that match the string patterns; and the tallying the scores for the one or more profiled programming languages comprises summing the first weight or the second weight associated with the one or more profiled programming languages that utilize the learned programming language patterns that match the string patterns.

4. A method comprising:

determining, by a data processing system, one or more programming languages to be profiled;

for each programming language to be profiled, selecting, by the data processing system, sets of code written in the programming language to be profiled from one or more known sources or repositories of code;

for each programming language to be profiled, generating, by the data processing system, a pattern map of learned programming language patterns from the sets of code written in the programming language to be profiled, wherein the learned programming language patterns comprise words and linear combinations thereof in the sets of code;

for each programming language to be profiled, comparing, by the data processing system, the pattern map generated for the programming language to be profiled against the pattern maps generated for the other profiled programming languages to be profiled, and generating, by the data processing system, a master voting map based on the comparisons between the programming languages to be profiled receiving, by the data processing system, a set of code;

generating, by the data processing system, a pattern map of discovered string patterns from the set of code, wherein the string patterns comprise words and linear combinations thereof in the set of code;

comparing, by the data processing system, the string patterns included within the pattern map against the learned programming language patterns included within the master voting map to identify one or more profiled programming languages that utilize the learned programming language patterns that match the string patterns, wherein the master voting map comprises for each learned programming language pattern, a first weight or a second weight associated with the one or more profiled programming languages that utilize the learned programming language pattern;

generating, by the data processing system, a score card for the set of code, wherein the generating comprises tallying scores for the one or more profiled programming languages based on the comparing and the first weight or the second weight associated with the one or more profiled programming languages that utilize the learned programming language patterns that match the string patterns, and recording the scores with the one or more profiled programming languages in the score card; and determining, by the data processing system, one or more programming languages used to write the set of code based on the score card.

5. The method of claim 4, wherein the generating the master voting map comprises:

removing, based on the comparing, each word and each linear combination of words that are found across all programming language to be profiled;

applying, based on the comparison, the first weight to each word and each linear combination of words that are found in only a single programming language to be profiled; and applying, based on the comparison, the second weight to each word and each linear combination of words that are found in multiple programming languages to be profiled; and populating the master voting map with each word and each linear combination of words that have the first weight or the second weight applied.

6. The method of claim 5, wherein the second weight is only applied to each word and each linear combination of words that are found in two or three programming languages to be profiled.

7. A non-transitory computer-readable memory storing a plurality of instructions executable by one or more processors, the plurality of instructions comprising instructions that when executed by the one or more processors cause the one or more processors to perform processing comprising:

receiving a set of code;

generating a pattern map of discovered string patterns from the set of code, wherein the string patterns comprise words and linear combinations thereof in the set of code, wherein the generating the pattern map comprises:
  parsing and splitting the set of code by lines and by words;
  identifying the words and linear combinations thereof in each line;
  counting a number of times each word and each linear combination thereof is identified within the set of code to obtain count values of each word and each linear combination thereof;
  flattening the pattern map by merging multiple instances of each word and each linear combination thereof into single instances based on the counting and associating the count values of each word and each linear combination thereof to the single instances of each word and each linear combination thereof; and
  sorting the single instances of each word and each linear combination thereof based on the count values;
comparing the string patterns included within the pattern map against learned programming language patterns included within a master voting map to identify one or more profiled programming languages that utilize the learned programming language patterns that match the string patterns, wherein the master voting map comprises for each learned programming language pattern, a first weight or a second weight associated with the one or more profiled programming languages that utilize the learned programming language pattern;
generating a score card for the set of code, wherein the generating comprises tallying scores for the one or more profiled programming languages based on the comparing and the first weight or the second weight associated with the one or more profiled programming languages that utilize the learned programming language patterns that match the string patterns, and recording the scores with the one or more profiled programming languages in the score card; and
determining one or more programming languages used to write the set of code based on the score card.

8. The non-transitory computer-readable memory of claim 7, wherein the pattern map comprises: (i) the string patterns for each word and each linear combination thereof identified throughout the set of code; and (ii) the count value for each word and each linear combination thereof indicative of a number of occurrences for each word and each linear combination thereof throughout the set of code.

9. The non-transitory computer-readable memory of claim 7, wherein:
the learned programming language patterns comprise words and linear combinations thereof in the one or more profiled programming languages;
the comparing the string patterns included within the pattern map against the learned programming language patterns included within the master voting map, comprises: comparing (i) each word and each linear combination thereof of the string patterns that has a count value equal to or greater than a predetermined threshold, against (ii) each word and each linear combination thereof of the learned programming language patterns, to identify the one or more profiled programming languages that utilize the learned programming language patterns that match the string patterns; and
the tallying the scores for the one or more profiled programming languages comprises summing the first weight or the second weight associated with the one or more profiled programming languages that utilize the learned programming language patterns that match the string patterns.

10. A non-transitory computer-readable memory storing a plurality of instructions executable by one or more processors, the plurality of instructions comprising instructions that when executed by the one or more processors cause the one or more processors to perform processing comprising:
determining one or more programming languages to be profiled;
for each programming language to be profiled, selecting sets of code written in the programming language to be profiled from one or more known sources or repositories of code;
for each programming language to be profiled, generating a pattern map of the learned programming language patterns from the sets of code written in the programming language to be profiled, wherein the learned programming language patterns comprise words and linear combinations thereof in the sets of code;
for each programming language to be profiled, comparing the pattern map generated for the programming language to be profiled against the pattern maps generated for the other profiled programming languages to be profiled, and generating a master voting map based on the comparisons between the programming languages to be profiled;
receiving a set of code;
generating a pattern map of discovered string patterns from the set of code, wherein the string patterns comprise words and linear combinations thereof in the set of code;
comparing the string patterns included within the pattern map against the learned programming language patterns included within the master voting map to identify one or more profiled programming languages that utilize the learned programming language patterns that match the string patterns, wherein the master voting map comprises for each learned programming language pattern, a first weight or a second weight associated with the one or more profiled programming languages that utilize the learned programming language pattern;
generating a score card for the set of code, wherein the generating comprises tallying scores for the one or more profiled programming languages based on the comparing and the first weight or the second weight associated with the one or more profiled programming languages that utilize the learned programming language patterns that match the string patterns, and recording the scores with the one or more profiled programming languages in the score card; and
determining one or more programming languages used to write the set of code based on the score card.

11. The non-transitory computer-readable memory of claim 10, wherein the generating the master voting map comprises:
removing, based on the comparing, each word and each linear combination of words that are found across all programming language to be profiled;
applying, based on the comparison, the first weight to each word and each linear combination of words that are found in only a single programming language to be profiled; and applying, based on the comparison, the second weight to each word and each linear combination of words that are found in multiple programming languages to be profiled; and populating the master voting map with each word and each linear combination of words that have the first weight or the second weight applied.

12. The non-transitory computer-readable memory of claim 11, wherein the second weight is only applied to each word and each linear combination of words that are found in two or three programming languages to be profiled.

13. A system comprising:
one or more processors; and
a memory coupled to the one or more processors, the memory storing a plurality of instructions executable by the one or more processors, the plurality of instructions comprising instructions that when executed by the one or more processors cause the one or more processors to perform processing comprising:
receiving a set of code;
generating a pattern map of discovered string patterns from the set of code, wherein the string patterns comprise words and linear combinations thereof in the set of code, wherein the generating the pattern map comprises:
parsing and splitting the set of code by lines and by words;
identifying the words and linear combinations thereof in each line;
counting a number of times each word and each linear combination thereof is identified within the set of code to obtain count values of each word and each linear combination thereof;
flattening the pattern map by merging multiple instances of each word and each linear combination thereof into single instances based on the counting and associating the count values of each word and each linear combination thereof to the single instances of each word and each linear combination thereof; and
sorting the single instances of each word and each linear combination thereof based on the count values;
comparing the string patterns included within the pattern map against learned programming language patterns included within a master voting map to identify one or more profiled programming languages that utilize the learned programming language patterns that match the string patterns, wherein the master voting map comprises for each learned programming language pattern, a first weight or a second weight associated with the one or more profiled programming languages that utilize the learned programming language pattern;
generating a score card for the set of code, wherein the generating comprises tallying scores for the one or more profiled programming languages based on the comparing and the first weight or the second weight associated with the one or more profiled programming languages that utilize the learned programming language patterns that match the string patterns, and recording the scores with the one or more profiled programming languages in the score card; and
determining one or more programming languages used to write the set of code based on the score card.

14. The system of claim 13, wherein the pattern map comprises: (i) the string patterns for each word and each linear combination thereof identified throughout the set of code; and (ii) the count value for each word and each linear combination thereof indicative of a number of occurrences for each word and each linear combination thereof throughout the set of code.

15. The system of claim 13, wherein:
the learned programming language patterns comprise words and linear combinations thereof in the one or more profiled programming languages;
the comparing the string patterns included within the pattern map against the learned programming language patterns included within the master voting map, comprises: comparing (i) each word and each linear combination thereof of the string patterns that has a count value equal to or greater than a predetermined threshold, against (ii) each word and each linear combination thereof of the learned programming language patterns, to identify the one or more profiled programming languages that utilize the learned programming language patterns that match the string patterns; and
the tallying the scores for the one or more profiled programming languages comprises summing the first weight or the second weight associated with the one or more profiled programming languages that utilize the learned programming language patterns that match the string patterns.

16. A system comprising:
one or more processors; and
a memory coupled to the one or more processors, the memory storing a plurality of instructions executable by the one or more processors, the plurality of instructions comprising instructions that when executed by the one or more processors cause the one or more processors to perform processing comprising:
determining one or more programming languages to be profiled;
for each programming language to be profiled, selecting sets of code written in the programming language to be profiled from one or more known sources or repositories of code;
for each programming language to be profiled, generating a pattern map of learned programming language patterns from the sets of code written in the programming language to be profiled, wherein the learned programming language patterns comprise words and linear combinations thereof in the sets of code;
for each programming language to be profiled, comparing the pattern map generated for the programming language to be profiled against the pattern maps generated for the other profiled programming languages to be profiled, and generating a master voting map based on the comparisons between the programming languages to be profiled:
receiving a set of code;
generating a pattern map of discovered string patterns from the set of code, wherein the string patterns comprise words and linear combinations thereof in the set of code;
comparing the string patterns included within the pattern map against the learned programming language patterns included within the master voting map to identify one or more profiled programming languages that utilize the learned programming language patterns that match the string patterns, wherein the master voting map comprises for each learned programming language pattern, a first weight or a second weight associated with the one or more profiled programming languages that utilize the learned programming language pattern;

generating a score card for the set of code, wherein the generating comprises tallying scores for the one or more profiled programming languages based on the comparing and the first weight or the second weight associated with the one or more profiled programming languages that utilize the learned programming language patterns that match the string patterns, and recording the scores with the one or more profiled programming languages in the score card; and determining one or more programming languages used to write the set of code based on the score card.

17. The system of claim 16, wherein the generating the master voting map comprises:

removing, based on the comparing, each word and each linear combination of words that are found across all programming language to be profiled;

applying, based on the comparison, the first weight to each word and each linear combination of words that are found in only a single programming language to be profiled; and applying, based on the comparison, the second weight to each word and each linear combination of words that are found in multiple programming languages to be profiled; and populating the master voting map with each word and each linear combination of words that have the first weight or the second weight applied.

* * * * *

UNITED STATES PATENT AND TRADEMARK OFFICE
CERTIFICATE OF CORRECTION

| | |
|---|---|
| PATENT NO. | : 11,360,764 B2 |
| APPLICATION NO. | : 16/939534 |
| DATED | : June 14, 2022 |
| INVENTOR(S) | : Murray |

It is certified that error appears in the above-identified patent and that said Letters Patent is hereby corrected as shown below:

On the Title Page

Item (57) Column 2, under Abstract, Line 7, delete "with" and insert -- within --, therefor.

Item (57) Column 2, under Abstract, Line 9, delete "programming," and insert -- programming --, therefor.

In the Specification

In Column 1, Line 42, delete "static an" and insert -- static analysis --, therefor.

In Column 4, Line 19, delete "purposes," and insert -- purposes --, therefor.

In Column 4, Line 40, delete "computing, device" and insert -- computing device --, therefor.

In Column 4, Line 53, delete "be," and insert -- be --, therefor.

In Column 4, Line 62, delete "file1.java~=file2.txt~=text." and insert -- file1.java~=java, file2.txt~=text. --, therefor.

In Column 5, Line 28, delete "or the," and insert -- or the --, therefor.

In Column 5, Line 66, delete "configured to," and insert -- configured to --, therefor.

In Column 6, Line 47, delete "art" and insert -- an --, therefor.

In Column 7, Line 11, delete "programming," and insert -- programming --, therefor.

In Column 8, Line 9, delete "process its" and insert -- process in its --, therefor.

Signed and Sealed this
Twentieth Day of December, 2022

Katherine Kelly Vidal
*Director of the United States Patent and Trademark Office*

CERTIFICATE OF CORRECTION (continued)
U.S. Pat. No. 11,360,764 B2

In Column 8, Line 23, delete "to" and insert -- 135 to --, therefor.

In Column 8, Line 49, delete "process, may" and insert -- process may --, therefor.

In Column 9, Line 36, delete "perforated" and insert -- performed --, therefor.

In Column 10, Line 22, delete "of" and insert -- or --, therefor.

In Column 10, Line 25, delete "sets," and insert -- sets --, therefor.

In Column 10, Line 60, delete "sinning" and insert -- starting --, therefor.

In Column 11, Line 25, delete "to," and insert -- to --, therefor.

In Column 11, Line 45, delete "molded;" and insert -- profiled; --, therefor.

In Column 12, Line 27, delete "learned," and insert -- learned --, therefor.

In Column 13, Line 21, delete "programming:" and insert -- programming --, therefor.

In Column 13, Line 51, delete "updated," and insert -- updated --, therefor.

In Column 13, Line 64, delete "depicted," and insert -- depicted --, therefor.

In Column 14, Line 49, delete "to (e.g.," and insert -- (e.g., --, therefor.

In Column 14, Line 60, delete "set code." and insert -- set of code. --, therefor.

In Column 15, Line 31, delete "mister" and insert -- master --, therefor.

In Column 15, Line 51, delete ""URLConnction"" and insert -- "URLConnection" --, therefor.

In Column 15, Line 66, delete "of 10," and insert -- of 5, 10, --, therefor.

In Column 16, Line 15, delete "full," and insert -- full --, therefor.

In Column 16, Line 26, delete "points" and insert -- points the --, therefor.

In Column 16, Line 51, delete "profited" and insert -- profiled --, therefor.

In Column 18, Line 65, delete "Control" and insert -- control --, therefor.

In Column 19, Line 30, delete "625" and insert -- 626 --, therefor.

In Column 19, Line 30, delete "minor" and insert -- mirror --, therefor.

CERTIFICATE OF CORRECTION (continued)
U.S. Pat. No. 11,360,764 B2

In Column 21, Line 58, delete "control," and insert -- control --, therefor.

In Column 23, Line 46, delete "550" and insert -- 650 --, therefor.

In Column 23, Line 46, delete "FIG. 6)" and insert -- FIG. 6). --, therefor.

In Column 26, Line 46, delete "calls," and insert -- calls --, therefor.

In Column 27, Line 28, delete "communicate," and insert -- communicate --, therefor.

In Column 28, Line 11, delete "gesture," and insert -- gesture --, therefor.

In Column 28, Line 49, delete "101" and insert -- 1018 --, therefor.

In Column 29, Line 2, delete "may" and insert -- which may --, therefor.

In Column 29, Line 9, delete "UNIX® UNIX-like" and insert -- UNIX® or UNIX-like --, therefor.

In Column 29, Line 10, delete "GNU/Linus" and insert -- GNU/Linux --, therefor.

In Column 29, Line 23, delete "repos" and insert -- repository --, therefor.

In Column 29, Line 35, delete "portions" and insert -- or portions --, therefor.

In Column 29, Line 41, delete "media," and insert -- media --, therefor.

In Column 30, Line 58, delete "processing," and insert -- processing --, therefor.

In Column 31, Lines 6-7, delete "alternative, constructions," and insert -- alternative constructions, --, therefor.

In the Claims

In Column 32, Line 60, in Claim 1, delete "thereof:" and insert -- thereof; --, therefor.

In Column 34, Line 11, in Claim 4, delete "profiled" and insert -- profiled; --, therefor.

In Column 35, Line 13, in Claim 7, delete "thereof:" and insert -- thereof; --, therefor.